(12) United States Patent
Li

(10) Patent No.: US 7,599,549 B2
(45) Date of Patent: Oct. 6, 2009

(54) IMAGE PROCESSING METHOD, IMAGE PROCESSING APPARATUS, AND COMPUTER READABLE MEDIUM, IN WHICH AN IMAGE PROCESSING PROGRAM IS RECORDED

(75) Inventor: Yuanzhong Li, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 640 days.

(21) Appl. No.: 11/312,756

(22) Filed: Dec. 21, 2005

(65) Prior Publication Data
US 2006/0133672 A1 Jun. 22, 2006

(30) Foreign Application Priority Data
Dec. 22, 2004 (JP) ............................. 2004-371861

(51) Int. Cl.
*G06K 9/62* (2006.01)
(52) U.S. Cl. .................... 382/155; 382/103; 382/118; 382/190
(58) Field of Classification Search ................ 382/118, 382/155, 190, 254, 294
See application file for complete search history.

(56) References Cited

U.S. PATENT DOCUMENTS

| | | | |
|---|---|---|---|
| 6,707,933 B1 * | 3/2004 | Mariani et al. ............... | 382/118 |
| 7,272,267 B1 * | 9/2007 | Nakajima .................... | 382/294 |
| 7,362,919 B2 * | 4/2008 | Das et al. ..................... | 382/284 |
| 2003/0108220 A1 * | 6/2003 | Jepson et al. ................ | 382/103 |
| 2004/0170323 A1 | 9/2004 | Cootes et al. | |
| 2004/0208387 A1 * | 10/2004 | Gondek et al. .............. | 382/254 |
| 2005/0065802 A1 * | 3/2005 | Rui et al. ........................ | 705/1 |
| 2005/0111737 A1 * | 5/2005 | Das et al. .................... | 382/190 |
| 2005/0180626 A1 * | 8/2005 | Moon et al. ................. | 382/159 |
| 2006/0008149 A1 * | 1/2006 | Tu et al. ..................... | 382/190 |

OTHER PUBLICATIONS

T.F. Cootes, et al. "The Use of Active Shape Models for Locating Structures in Medical Images", Image and Vision Computing, vol. 12, Issue 6, pp. 355-366, 1994.

* cited by examiner

*Primary Examiner*—Gregory M Desire
(74) *Attorney, Agent, or Firm*—Sughrue Mion, PLLC

(57) ABSTRACT

A plurality of landmarks, which are employed in statistical models, such as an ASM, that is, a plurality of landmarks that represent the shape and the like of a predetermined subject, such as a face, within an image, are detected. Discrimination regarding whether each pixel within the image is a point that represents a landmark is performed based on discrimination conditions. The discrimination conditions correspond to characteristic amounts, which are obtained by learning characteristic amounts of positions, which are known to be landmarks, and characteristic amounts of positions, which are known to not be landmarks, within a plurality of sample images of the subject, by a machine learning technique.

19 Claims, 11 Drawing Sheets

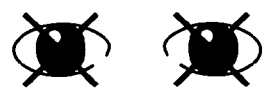
FIG.4A　　　FIG.4B
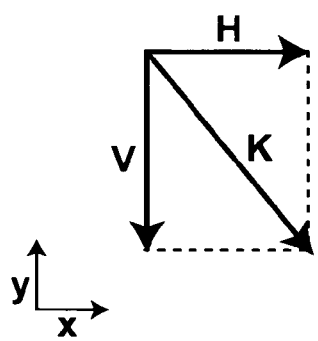
FIG.5A　　　FIG.5B
FIG.6
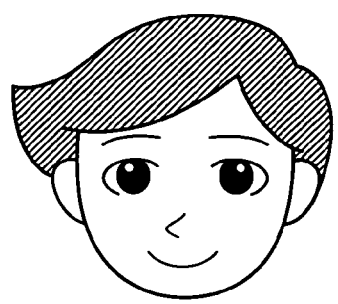
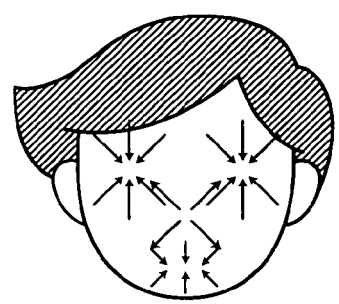
FIG.7A　　　FIG.7B

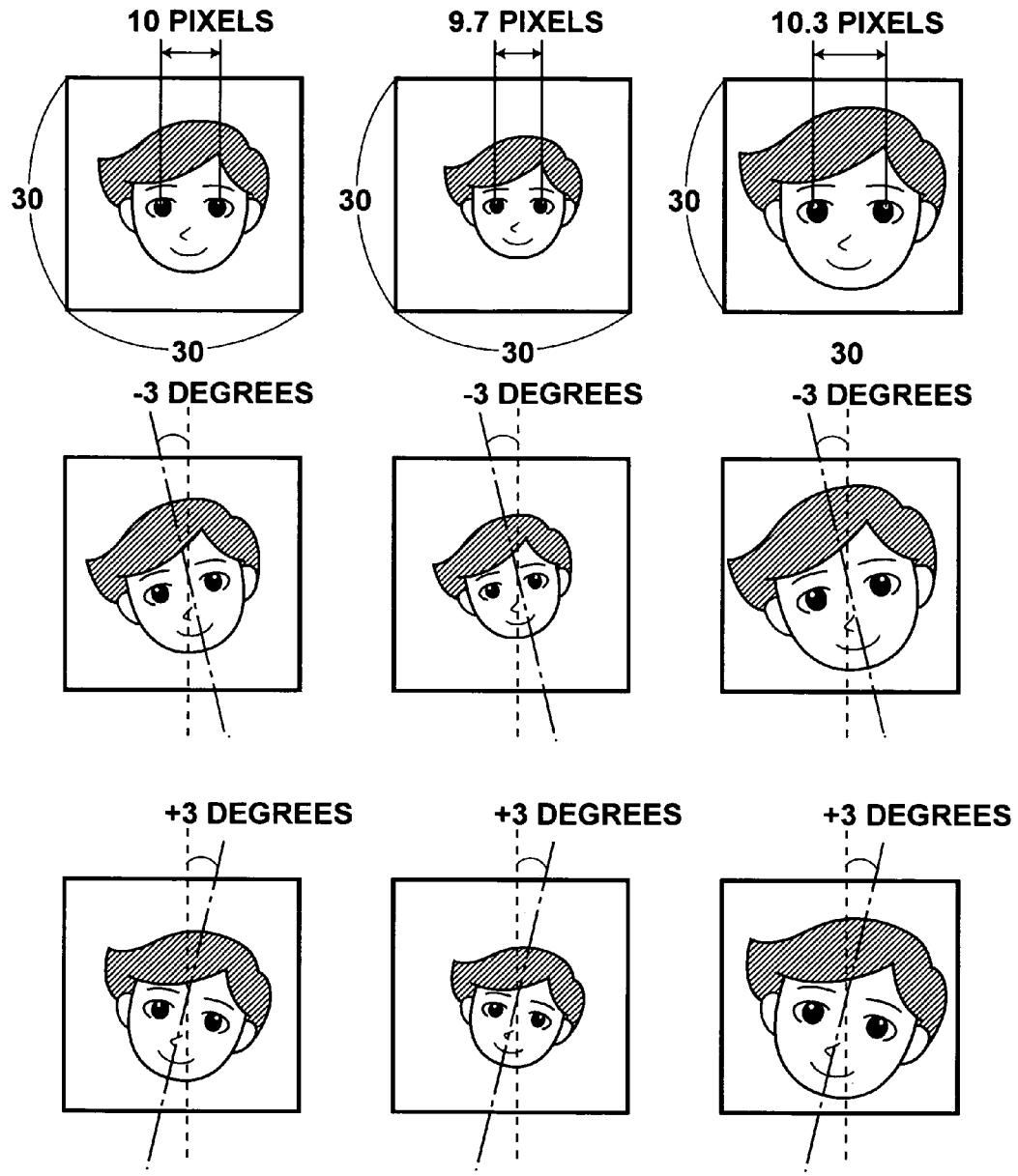

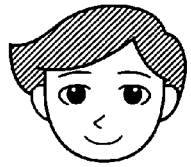 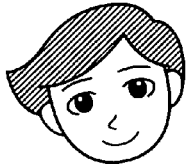 
FIG.11A  FIG.11B  FIG.11C
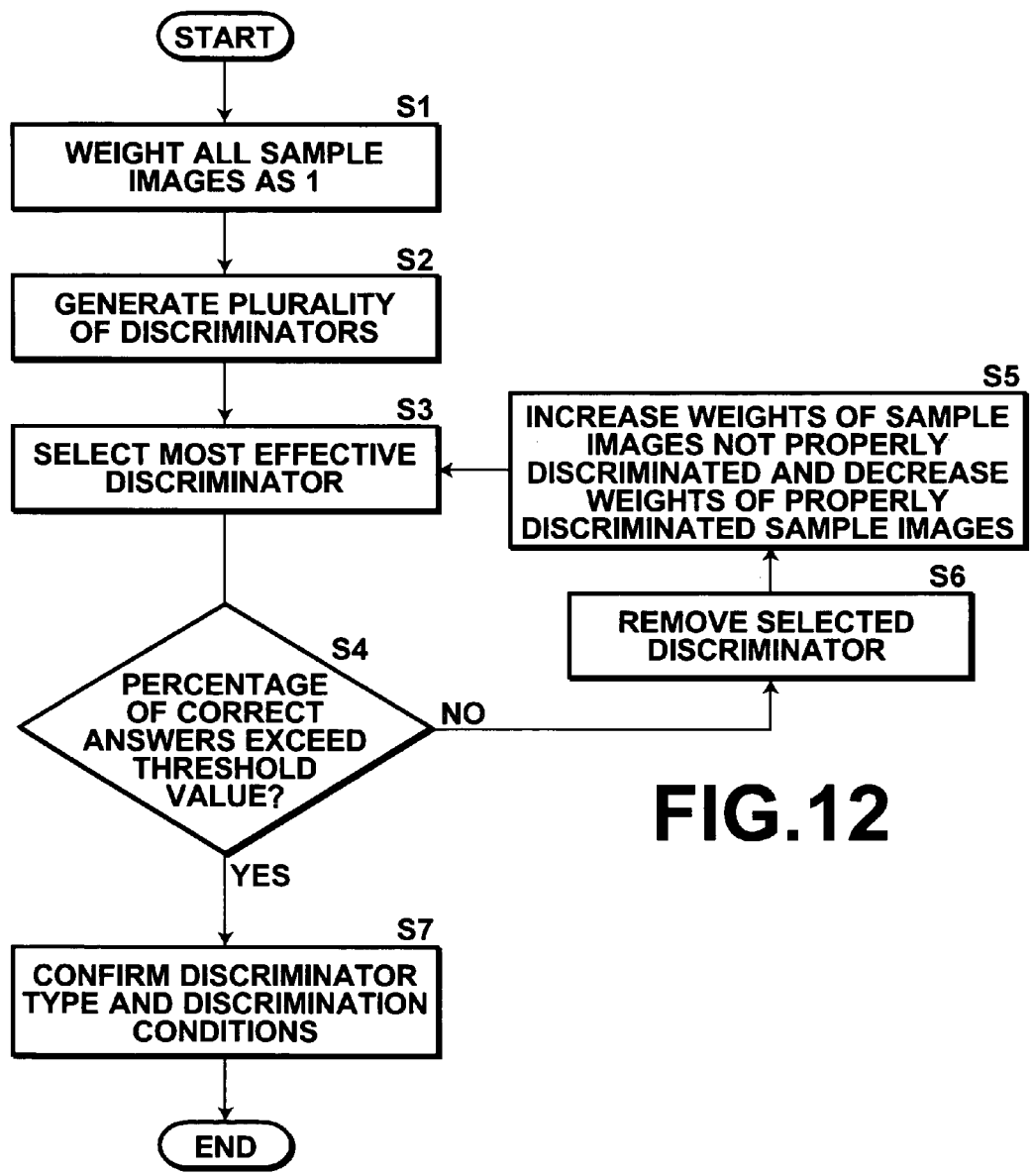
FIG.12

IMAGE PROCESSING METHOD, IMAGE PROCESSING APPARATUS, AND COMPUTER READABLE MEDIUM, IN WHICH AN IMAGE PROCESSING PROGRAM IS RECORDED

BACKGROUND OF THE INVENTION

1. Field of the Invention

The present invention relates to an image processing method, an image processing apparatus, and a computer readable medium, in which an image processing program is recorded. Specifically, the present invention relates to an image processing method, an image processing apparatus, and a computer readable medium, in which an image processing program is recorded, for discriminating the shapes of predetermined subjects, such as faces, that are included in images.

2. Description of the Related Art

Statistical models are constructed of predetermined subjects, such as human faces and body parts, which are included in images, by employing image data sets that represent the images, in the fields of medical diagnostic images and verification employing physical characteristics. Various methods have been proposed for constructing the statistical models.

An ASM (Active Shape Model), which is capable of representing the positions, shapes, and sizes of each structural element of a predetermined subject, such as cheeks, eyes, and mouths that constitute faces, is disclosed in T. F. Coots, A. Hill, C. J. Taylor, and J. Haslam, "Use of Active Shape Models for Locating Structures in Medical Images", Image and Vision Computing, pp. 355-365, Volume 12, Issue 6, 1994, and in U.S. Patent Application Publication No. 20040170323. The method for constructing an ASM comprises the following steps. First, as illustrated in FIG. 18, positions of landmarks that represent the positions, shapes, and sizes of each structural element of a predetermined subject (a face, in the example of FIG. 18) are specified within a plurality of sample images of the predetermined subject, to obtain a frame model for each sample image. The frame model is formed by connecting points, which are the landmarks, according to predetermined rules. For example, in the case that the predetermined subject is a face, points along the facial outline, points along the lines of the eyebrows, points along the outlines of the eyes, points at the positions of the irises, points along the lines of the upper and lower lips, and the like are specified as the landmarks. Frames constituted by connecting the points at the positions of the irises, the positions along the facial outline, the points along the lines of the eyebrows and the like comprise the frame model of the face. Frame models, which are obtained from the plurality of sample images, are averaged to obtain an average facial frame model. The positions of each of the landmarks within the average facial frame model are designated to be the average positions of corresponding landmarks of each of the sample images. For example, in the case that 130 landmarks are specified within a face, and the $110^{th}$ landmark indicates the position of the tip of the chin, the position of the $110^{th}$ landmark in the average frame model is a position obtained by averaging the positions of the $110^{th}$ landmark within the sample images. In the ASM technique, the average frame model obtained in this manner is applied to the predetermined subject pictured in a target image, on which image processes are administered. The positions of the landmarks within the applied average frame model are set to be the initial values of the positions of the landmarks within the predetermined subject pictured in the target image. The average frame model is deformed to match the predetermined subject pictured in the target image (that is, the positions of each landmark within the average frame model are moved), thereby obtaining the positions of each landmark within the predetermined subject pictured in the target image. Here, the deformation of the average frame model will be described.

As described above, the frame model that represents the predetermined subject is defined by the positions of the landmarks within the frame model. Therefore, in the case of a two dimensional frame model S, the frame model S can be represented by vectors comprising 2n (wherein n is the number of landmarks) components, defined in Formula (1) below.

$$S=(X_1, X_2, \ldots, X_n, X_{n+1}, X_{n+2}, \ldots, X_{2n}) \quad (1)$$

wherein
S: frame model
n: number of landmarks
$X_i$ ($1 \leq i \leq n$): the X direction coordinate value of an $i^{th}$ landmark
$X_{n+i}$ ($1 \leq i \leq n$): the Y direction coordinate value of an $i^{th}$ landmark The average frame model Sav is defined by Formula (2) below.

$$Sav=(\overline{X}_1, \overline{X}_2, \ldots, \overline{X}_n, \overline{X}_{n+1}, \overline{X}_{n+2}, \ldots, \overline{X}_{2n}) \quad (2)$$

wherein
Sav: average frame model
n: number of landmarks
$\overline{X}_i$ ($1 \leq i \leq n$): the average X direction coordinate value of an $i^{th}$ landmark
$\overline{X}_{n+i}$ ($1 \leq i \leq n$): the average Y direction coordinate value of an $i^{th}$ landmark The matrix illustrated in Formula (3) below can be derived, employing frame models of each sample image and the average frame model Sav obtained therefrom.

$$\begin{bmatrix} \sum_{j=1}^{m}(X_1^j - \overline{X}_1)^2 & \sum_{j=1}^{m}(X_1^j - \overline{X}_1)(X_2^j - \overline{X}_2) \cdots & \sum_{j=1}^{m}(X_1^j - \overline{X}_1)(X_{2n-1}^j - \overline{X}_{2n-1}) & \sum_{j=1}^{m}(X_1^j - \overline{X}_1)(X_{2n}^j - \overline{X}_{2n}) \\ \sum_{j=1}^{m}(X_1^j - \overline{X}_1)(X_2^j - \overline{X}_2) & \sum_{j=1}^{m}(X_2^j - \overline{X}_2) \cdots & \sum_{j=1}^{m}(X_2^j - \overline{X}_2)(X_{2n-1}^j - \overline{X}_{2n-1}) & \sum_{j=1}^{m}(X_2^j - \overline{X}_2)(X_{2n}^j - \overline{X}_{2n}) \\ \vdots & \vdots & \vdots & \vdots \\ \sum_{j=1}^{m}(X_1^j - \overline{X}_1)(X_{2n-1}^j - \overline{X}_{2n-1}) & \sum_{j=1}^{m}(X_2^j - \overline{X}_2)(X_{2n-1}^j - \overline{X}_{2n-1}) \cdots & \sum_{j=1}^{m}(X_{2n-1}^j - \overline{X}_{2n-1})^2 & \sum_{j=1}^{m}(X_{2n-1}^j - \overline{X}_{2n-1})(X_{2n}^j - \overline{X}_{2n}) \\ \sum_{j=1}^{m}(X_1^j - \overline{X}_1)(X_{2n}^j - \overline{X}_{2n}) & \sum_{j=1}^{m}(X_2^j - \overline{X}_2)(X_2^j - \overline{X}_2) \cdots & \sum_{j=1}^{m}(X_{2n-1}^j - \overline{X}_{2n-1})(X_{2n}^j - \overline{X}_{2n}) & \sum_{j=1}^{m}(X_{2n}^j - \overline{X}_{2n})^2 \end{bmatrix} \quad (3)$$

wherein
n: number of landmarks
m: number of sample images
$X_i^j (1 \leq i \leq n)$: the X coordinate value of an $i^{th}$ landmark within a $j^{th}$ sample image
$X_{n+i}^j (1 \leq i \leq n)$: the Y coordinate value of an $i^{th}$ landmark within a $j^{th}$ sample image
$\overline{X}_i (1 \leq i \leq n)$: the average X coordinate value of an $i^{th}$ landmark
$\overline{X}_{n+i} (1 \leq i \leq n)$: the average Y direction coordinate value of an $i^{th}$ landmark
K $(1 \leq K \leq 2n)$ unique vectors $P_j$ ($P_{j1}$, $P_{j2}$ ..., $P_{j(2n)}$) $(1 \leq j \leq K)$, and unique values $\lambda_j$ $(1 \leq j \leq K)$, corresponding to each of the unique vectors $P_j$, are derived from the matrix illustrated in Formula (3). Deformation of the average frame model Sav is performed employing the unique vectors $P_j$, according to Formula (4) below.

$$S_h = Sav + \Delta S \qquad (4)$$
$$\Delta S = \sum_{j=1}^{K} b_j P_j$$

wherein
$S_h$: the frame model after deformation
Sav: the average frame model
$\Delta S$: the amount of positional movement of a landmark
K: number of unique vectors
$P_j$: a unique vector
$b_j$: a deformation parameter $\Delta S$ in Formula (4) represents the amount of positional movement of each landmark. That is, the deformation of the average frame model Sav is performed by moving the positions of each landmark. As can be understood from Formula (4), the amount of positional movement $\Delta S$ of each landmark is derived from a deformation parameter $b_j$ and a unique vector $P_j$. The unique vector $P_j$ is obtained in advance. Therefore, it is necessary to obtain the deformation parameter $b_j$, in order to deform the average frame model Sav. Here, obtainment of the deformation parameter $b_j$ will be described.

The deformation parameter $b_j$ is obtained in the following manner. First, characteristic amounts that specify each of the landmarks are obtained for each landmark within each of the sample images. Here, an example will be described in which the characteristic amount is a brightness profile, and the landmark is that which is positioned at the recess of an upper lip. The landmark positioned at the recess of the upper lip is the center of the upper lip (point A0 in FIG. 19A). A first line that connects the landmarks adjacent thereto at both sides thereof (points A1 and A2 in FIG. 19A) is drawn. A line L perpendicular to the first line and that passes through the landmark A0 is drawn. The brightness profile within a small region (for example, 11 pixels) along the line L with the landmark A0 at its center is obtained as the characteristic amount of the landmark A0. FIG. 19B is a graph that represents the brightness profile, which is the characteristic amount of the landmark A0 of FIG. 19A.

A totalized characteristic amount that specifies landmarks positioned at the recesses of upper lips is obtained from the brightness profiles of the landmarks positioned at the recesses of upper lips within each of the sample images. There are differences among the characteristic amounts of corresponding landmarks (for example, landmarks positioned at the recesses of upper lips) within the plurality of sample images.

However, the totalized characteristic amount is obtained on the assumption that a Gaussian distribution is present for the characteristic amounts. An averaging process is an example of a method for obtaining the totalized characteristic amount based on the assumption that a Gaussian distribution is present. That is, the brightness profiles of each landmark within each of the plurality of sample images are obtained. The brightness profiles of corresponding landmarks among the plurality of sample images are averaged, and designated as totalized characteristic amounts. That is, the totalized characteristic amount of the landmark positioned at the recess of an upper lip is obtained by averaging the brightness profiles of landmarks positioned at the recesses of the upper lips within the plurality of sample images.

Deformation of the average frame model Sav to match the predetermined subject, which is included in the target image, in the ASM technique is performed in the following manner. First, a point which has a characteristic amount most similar to the totalized characteristic amount of a corresponding landmark is detected from within a region of the target image that includes the corresponding landmark of the average frame model Sav. For example, in the case of the recess of an upper lip, a region, which is greater than the aforementioned small region, that includes the position corresponding to the landmark at the recess of the upper lip in the average frame model Sav is set within the target image. The region may be, for example, 21 pixels along the aforementioned line L, having the first position at its center. Brightness profiles are obtained from within 11 pixel regions having each of the pixels within the 21 pixel region as their centers. A brightness profile which is most similar to the totalized characteristic amount (that is, the average brightness profile) is selected from among the obtained brightness profiles. The distance between the position at which this brightness profile was obtained (the center pixel of the 11 pixels for which the brightness profile was obtained) and the first position is obtained. The amount of positional movement, for the position of the landmark at the position of the recess of the upper lip within the average frame model Sav to be moved, is determined based on the distance. The deformation parameter $b_j$ is calculated from the amount of positional movement. Specifically, the amount of positional movement is determined to be less than the distance, for example, ½ the distance. The deformation parameter $b_j$ is calculated from the amount of positional movement.

Note that the amount of positional movement of the landmarks is limited by employing unique values $\lambda_j$, as indicated in Formula (5) below. The amount of positional movement is limited so that the frame model obtained after deforming the average frame model Sav will still be able to represent a face.

$$3\sqrt{\lambda_j} \leq b_j \leq 3\sqrt{\lambda_j} \qquad (5)$$

wherein
$b_j$: deformation parameter
$\lambda_j$: unique value

In this manner, the ASM technique deforms the average frame model Sav by moving the position of each landmark, until the deformed frame model converges onto the predetermined subject pictured in the target image. Thereby, a frame model of the predetermined subject pictured in the target image, defined by the positions of each landmark after deformation, is obtained.

However, the aforementioned ASM technique obtains the totalized characteristic amounts from corresponding landmarks within the plurality of sample images, based on the assumption that Gaussian distributions apply to the characteristic amounts of corresponding landmarks. Therefore, the ASM technique cannot be applied to cases in which Gaussian distributions do not apply, such as when variation in characteristic amounts of corresponding landmarks is great, or when illumination conditions differ among sample images. For example, brightness profiles of landmarks positioned at the recess of the upper lip differ greatly depending on whether the subject has a moustache or not. In these cases, a Gaussian distribution does not apply. For this reason, if average brightness profiles, for example, are obtained as totalized characteristic amounts, based on the assumption that Gaussian distributions apply, and landmarks within the target image are detected employing these totalized characteristic amounts, the detection accuracy is poor, and the process is not robust.

SUMMARY OF THE INVENTION

The present invention has been developed in view of the foregoing circumstances. It is an object of the present invention to provide an image processing method, an image processing apparatus, and an image processing program that improve accuracy in discrimination of shapes of predetermined subjects pictured in images, and improve robustness of the discrimination process.

The image processing method of the present invention is an image processing method for detecting the positions of a plurality of landmarks that indicate the shape of a predetermined subject by their positions and/or their positional relationships, from within the predetermined subject included in an image, comprising the steps of:

setting the positions of a plurality of landmarks that indicate the average shape of the predetermined subject as preliminary positions of the landmarks included in the predetermined subject included in the image;

calculating characteristic amounts, which are defined for a landmark corresponding to a preliminary position, of each pixel within a range of pixels that includes the preliminary position to discriminate the landmark;

judging whether pixels that represent the landmark are included in the range, by discriminating whether each of the pixels within the range represents the landmark;

moving the preliminary position to approach the position of the pixel which has been discriminated to represent the landmark, in the case that the judgment is affirmative;

repeating the preceding three steps for all of the preliminary positions; and determining the positions of the preliminary positions after they have been moved to be the positions of the landmarks that correspond to each of the preliminary positions;

the discrimination regarding whether the pixels represent the landmarks being performed, based on learning characteristic amounts of positions, which are known to represent the landmarks, and characteristic amounts of positions, which are known to not represent the landmarks, of a plurality of sample images by a machine learning technique.

Here, the "shape of a predetermined subject" may be the shape of the outline of the predetermined subject, but is not limited to this. In the case that the predetermined subject comprises a plurality of constituent elements, the "shape of a predetermined subject" may be the positions of the constituent elements and/or the positional relationships among the constituent elements. In addition, the shapes of the constituent elements may be the "shape of a predetermined subject".

The step of "moving the preliminary position to approach the position of the pixel which has been discriminated to represent the landmark" refers to a process by which the difference between the preliminary position and the position of the pixel which has been discriminated to represent the landmark is decreased. For example, the preliminary position can be moved for a ½ or a ⅓ of the difference between its position prior to movement and the position of the pixel which has been discriminated to represent the landmark. Note that the initial values of the preliminary positions are the positions of a plurality of landmarks that represent the average shape of the predetermined subject. If the amount of movement of the preliminary positions is excessive, there is a possibility that the shape represented by the landmarks after movement will be different from that of the predetermined subject. Therefore, it is preferable that the amount of movement is limited by limiting the deformation parameter $b_j$ in Formula (5) above. Generally, the positions of the plurality of landmarks that represent the average shape of the predetermined subject are obtained by averaging the positions of corresponding landmarks of the predetermined subject within a great number of sample images. Therefore, by analyzing the main components of the average shape, that is, by employing the matrix illustrated in Formula (3), the unique values $\lambda_j$ and the unique vectors $P_j$ can be obtained. The deformation parameters $b_j$ can be calculated, by substituting the unique vectors $P_j$ and the amounts of movement determined for each preliminary position into Formula (4) above. In the case that $b_j$ satisfies Formula (5) above, the amount of movement corresponding to the deformation parameter $b_j$ is maintained. In the case that $b_j$ does not satisfy Formula (5), the amount of movement corresponding to the deformation parameter $b_j$ is corrected such that it falls within the range defined in Formula (5), and preferably such that it assumes the maximum value within the range.

The "machine learning technique" of the present invention may be a neural network technique, a boosting technique, or the like.

It is preferable that the preliminary position is not moved, in the case that it is judged that a pixel that represents the landmark corresponding to the preliminary position is not included in the range of pixels that includes the preliminary position.

The characteristic amounts may be any amount that enables discrimination of the landmarks. For example, the characteristic amounts may be brightness profiles of the positions of the landmarks.

Alternatively, the characteristic amounts may be derivative values of the brightness profiles of the positions of the landmarks.

Note that it is desirable that the brightness profiles or the derivative values of the brightness profiles are polytomized.

The image processing method of the present invention may be applied to discriminating the shapes of human faces.

The image processing apparatus of the present invention is an image processing apparatus for detecting the positions of a plurality of landmarks that indicate the shape of a predetermined subject by their positions and/or their positional relationships, from within the predetermined subject included in an image, comprising:

preliminary position setting means, for setting the positions of a plurality of landmarks that indicate the average shape of the predetermined subject as preliminary positions of the landmarks included in the predetermined subject included in the image;

moving means, for: calculating characteristic amounts, which are defined for a landmark corresponding to a preliminary position, of each pixel within a range of pixels that includes the preliminary position to discriminate the landmark; judging whether pixels that represent the landmark are included in the range, by discriminating whether each of the pixels within the range represents the landmark; moving the preliminary position to approach the position of the pixel which has been discriminated to represent the landmark, in the case that the judgment is affirmative; and repeating the preceding three steps for all of the preliminary positions; and landmark position determining means, for determining the positions of the preliminary positions after they have been moved to be the positions of the landmarks that correspond to each of the preliminary positions;

the moving means performing discrimination regarding whether the pixels represent the landmarks, based on learning characteristic amounts of positions, which are known to represent the landmarks, and characteristic amounts of positions, which are known to not represent the landmarks, of a plurality of sample images by a machine learning technique.

It is preferable that the moving means does not move the preliminary position in the case that it is judged that a pixel that represents the landmark corresponding to the preliminary position is not included in the range of pixels that includes the preliminary position.

The image processing method of the present invention may be provided as a program that causes a computer to execute the method. The program may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be store and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

The image processing method and the image processing apparatus of the present invention detects points that represent landmarks of a predetermined subject included in an image, in order to discriminate the shape of the predetermined subject, such as a face. Discriminators, obtained by learning brightness profiles of points which are known to be landmarks within a plurality of sample images and brightness profiles of points which are known to not be landmarks within a plurality of sample images, and discriminating conditions corresponding to each discriminator are employed to detect the landmarks. Therefore, accuracy and robustness of detection is high, compared to conventional techniques that detect brightness profiles similar to average brightness profiles obtained from points which are known to be landmarks within a plurality of sample images.

BRIEF DESCRIPTION OF THE DRAWINGS

FIGS. 4A and 4B are diagrams for explaining the center positions of eyes.

FIGS. 5A and 5B illustrate edge detection filters.

FIG. 6 is a diagram for explaining calculation of gradient vectors.

FIG. 7A illustrates a human face, and FIG. 7B illustrates gradient vectors in the vicinities of the eyes and the mouth within the human face.

FIG. 10 illustrates examples of sample images, which are known to be of faces, employed during learning of second reference data.

FIGS. 11A, 11B, and 11C are diagrams for explaining rotation of faces.

FIG. 12 is a flow chart that illustrates the learning technique for reference data.

DESCRIPTION OF THE PREFERRED EMBODIMENTS

Hereinafter, embodiments of the present invention will be described with reference to the attached drawings.

Figure 1:
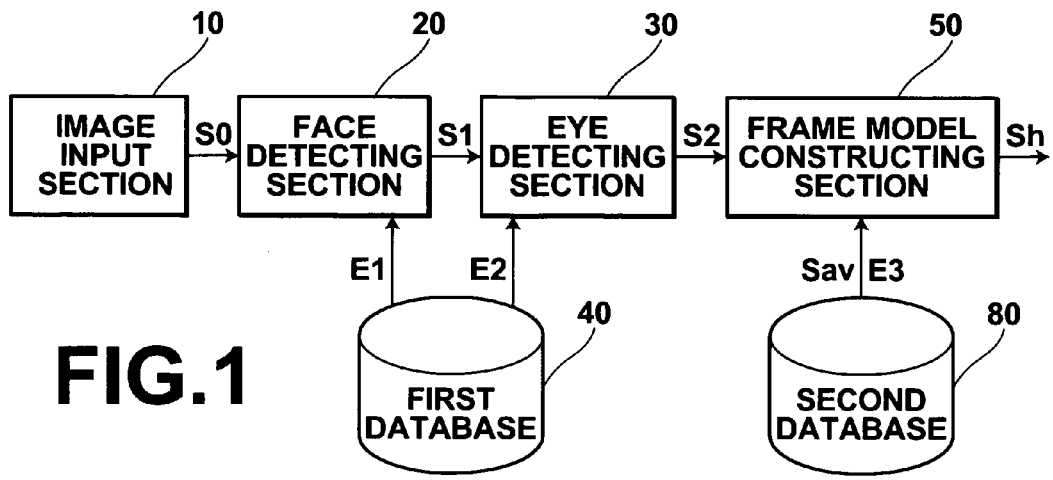
FIG. 1 is a block diagram that illustrates the construction of an image processing apparatus according to an embodiment of the present invention.

FIG. 1 is a block diagram that illustrates the construction of an image processing apparatus according to an embodiment of the present invention. Note that the image processing apparatus of the present embodiment is that which obtains frame models of faces, by detecting faces within images which are input thereto. The image processing apparatus is realized by executing an image processing program, which is read into an auxiliary memory device, on a computer (a personal computer, for example). The image processing program is distributed by being recorded on data recording media, such as CD-ROM's, or distributed via networks, such as the Internet, and installed on the computer.

Image data sets represent images. Hereinafter, the term "image" will be used to describe both image data sets and the images represented thereby.

As illustrated in FIG. 1, the image processing apparatus of the present invention comprises: an image input section 10, for inputting an image S0 as a target of processing; a face detecting section 20, for detecting a face from within the image S0 to obtain an image of the facial portion S1 (hereinafter, referred to as "facial image S1") therein; an eye detecting section 30, for detecting the positions of eyes within the facial image S1 to obtain a facial image S2 (details will be described later); a frame model constructing section 50, for constructing a frame model Sh of the face within the facial image S2; a first database 40, for storing reference data E1 to be employed by the face detecting section 20 and reference data E2 to be employed by the eye detecting section 30; and a second database 80, for storing an average frame model Sav and reference data E3, to be employed by the frame model constructing section 50.

The image input section 10 inputs images S0, which are targets of processing, to the image processing apparatus of the present embodiment. The image input section 10 may be: a receiving section, for receiving images S0 transmitted via networks; a readout section, for reading out images S0 from recording media such as CD-ROM's; or a scanner, for photoelectrically reading out images printed on from print media, such as paper or photographic prints, to obtain images S0.

Figure 2:
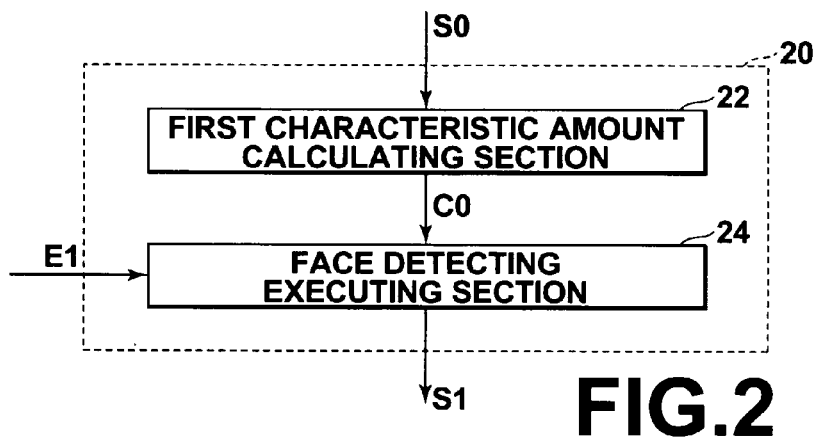
FIG. 2 is a block diagram illustrating the construction of the face detecting section 20 of the image processing apparatus of FIG. 1.

FIG. 2 is a block diagram illustrating the construction of the face detecting section 20 of the image processing apparatus of FIG. 1. The face detecting section 20 discriminates whether a face is included in an image S0, and detects the approximate size and position of the face in the case that a face is included in the image S0. The face detecting section 20 extracts an image represented by the detected size and position from the image S0, to obtain the facial image S1. As illustrated in FIG. 2, the face detecting section 20 comprises: a first characteristic amount calculating section 22, for calculating characteristic amounts C0 from the images S0; and a face detection executing section 24, for detecting facial regions from within the images S0, based on the characteristic amounts C0 calculated by the first characteristic amount calculating section 22 and the reference data E1 stored in the database 40. Here, the reference data sets E1 recorded in the first database 40 and each of the constituent parts of the face detecting section 20 will be described in detail.

The first characteristic amount calculating section 22 of the face detecting section 20 calculates the characteristic amounts C0, which are employed to discriminate faces, from the images S0. Specifically, gradient vectors (the direction and magnitude of density change at each pixel within the images S0) are calculated as the characteristic amounts C0. Hereinafter, calculation of the gradient vectors will be described. First, the first characteristic amount calculating section 22 detects edges in the horizontal direction within a image S0, by administering a filtering process with a horizontal edge detecting filter, as illustrated in FIG. 5A. The first characteristic amount calculating section 22 also detects edges in the vertical direction within the image S0, by administering a filtering process with a vertical edge detecting filter, as illustrated in FIG. 5B. Then, gradient vectors K for each pixel of the image S0 are calculated from the size H of horizontal edges and the size V of the vertical edges, as illustrated in FIG. 6.

In the case of a human face, such as that illustrated in FIG. 7A, the gradient vectors K, which are calculated in the manner described above, are directed toward the centers of eyes and mouths, which are dark, and are directed away from noses, which are bright, as illustrated in FIG. 7B. In addition, the magnitudes of the gradient vectors K are greater for the eyes than for the mouth, because changes in density are greater for the eyes than for the mouth.

The directions and magnitudes of the gradient vectors K are designated as the characteristic amounts C0. Note that the directions of the gradient vectors K are values between 0 and 359, representing the angle of the gradient vectors K from a predetermined direction (the x-direction in FIG. 6, for example).

Figure 8A:
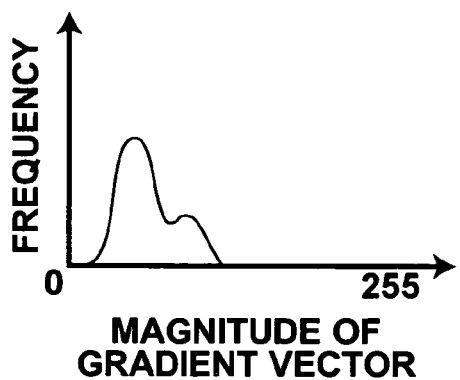
FIG. 8A illustrates a histogram that represents magnitudes of gradient vectors prior to normalization.
Figure 8B:
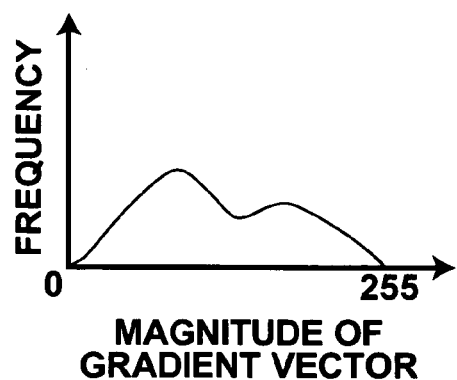
FIG. 8B illustrates a histogram that represents magnitudes of gradient vectors following normalization.
Figure 8C:
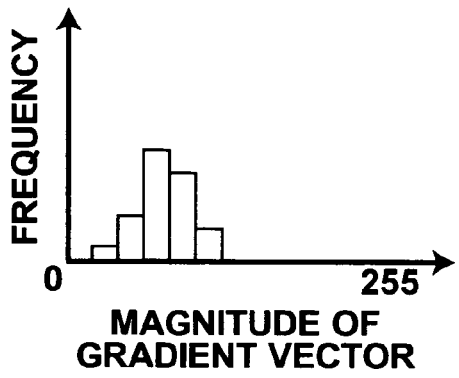
FIG. 8C illustrates a histogram that represents magnitudes of gradient vectors, which has been divided into five regions.
Figure 8D:
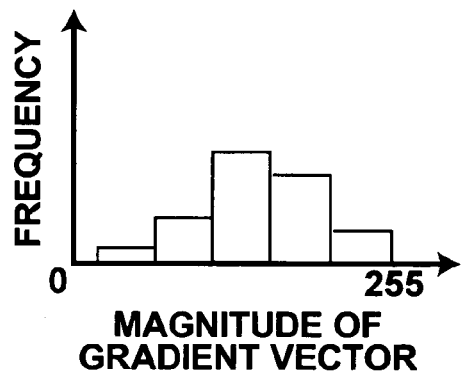
FIG. 8D illustrates a histogram that represents normalized magnitudes of gradient vectors, which has been divided into five regions.

Here, the magnitudes of the gradient vectors K are normalized. The normalization is performed in the following manner. First, a histogram that represents the magnitudes of the gradient vectors K of all of the pixels within the image S0 is derived. Then, the magnitudes of the gradient vectors K are corrected, by flattening the histogram so that the distribution of the magnitudes is evenly distributed across the range of values assumable by each pixel of the candidate image (0 through 255 in the case that the image data is 8 bit data). For example, in the case that the magnitudes of the gradient vectors K are small and concentrated at the low value side of the histogram, as illustrated in FIG. 8A, the histogram is redistributed so that the magnitudes are distributed across the entire range from 0 through 255, as illustrated in FIG. 8B. Note that in order to reduce the amount of calculations, it is preferable that the distribution range of the gradient vectors K in a histogram be polytomized into five values, for example, as illustrated in FIG. 8C. Then, the gradient vectors K are normalized by redistributing the histogram such that the frequency distribution, which has been polytomized into five values, is distributed across the entire range of values from 0 through 255, as illustrated in FIG. 8D.

The reference data E1, recorded in the first database 40, define discrimination conditions for combinations of the characteristic amounts C0 for each pixel of each of a plurality of types of pixel groups, which are constituted by a plurality of pixels selected from sample images, to be described later.

The combinations of the characteristic amounts C0 and the discrimination conditions within the reference data E1 are set in advance by learning. The learning is performed by employing a sample image group comprising a plurality of sample images, which are known to be of faces, and a plurality of sample images, which are known to not be of faces.

Figure 9:
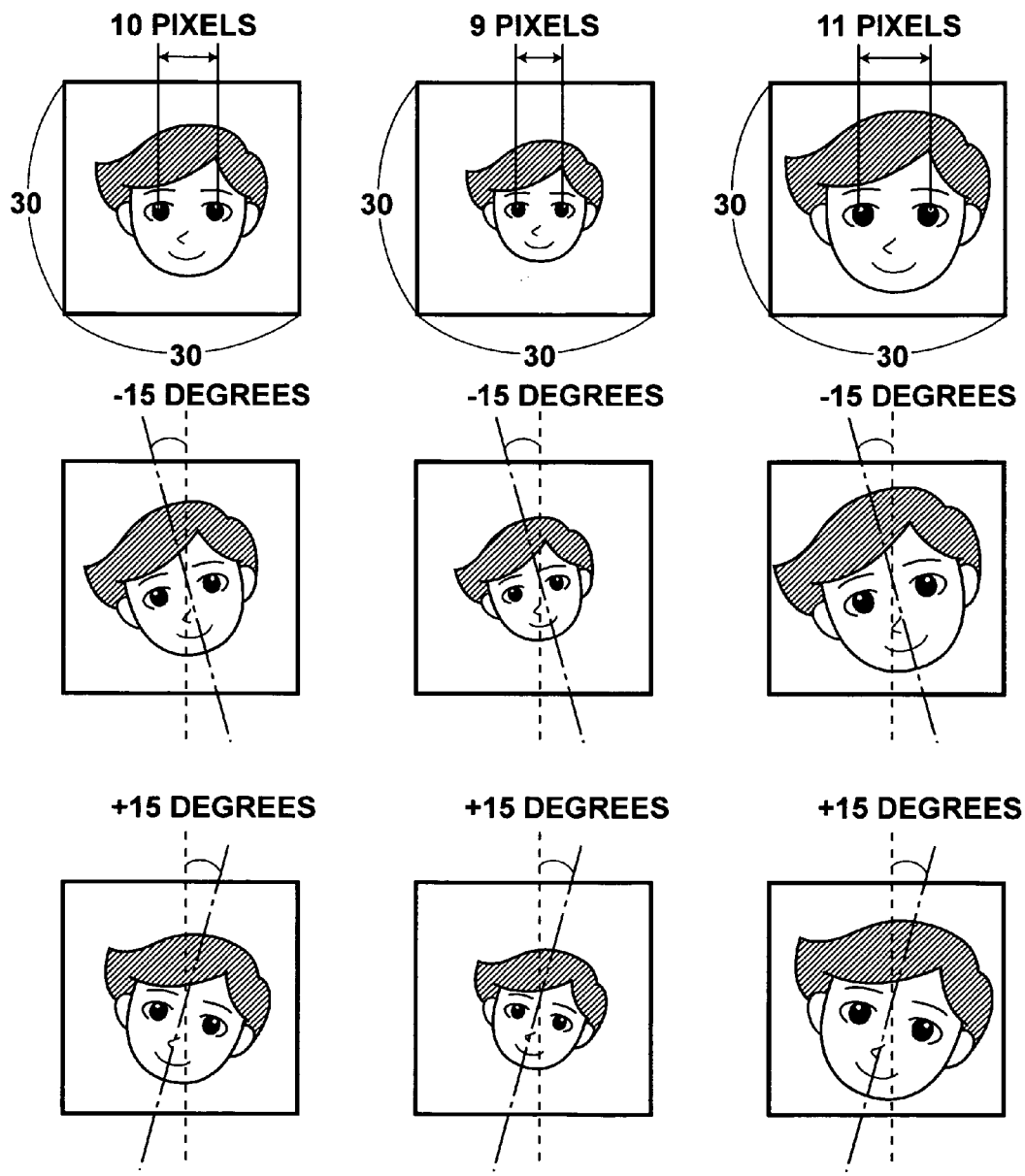
FIG. 9 illustrates examples of sample images, which are known to be of faces, employed during learning of first reference data.

Note that in the present embodiment, the sample images, which are known to be of faces and are utilized to generate the reference data E1, have the following specifications. That is, the sample images are of a 30×30 pixel size, the distances between the centers of the eyes of each face within the images are one of 9, 10, or 11 pixels, and the faces are rotated stepwise in three degree increments within a range of ±15 degrees from the vertical (that is, the rotational angles are −15 degrees, −12 degrees, −9 degrees, −6 degrees, 0 degrees, 3 degrees, 6 degrees, 9 degrees, 12 degrees, and 15 degrees), as illustrated in FIG. 9. Accordingly, 33 sample images (3×11) are prepared for each face. Note that only sample images which are rotated −15 degrees, 0 degrees, and 15 degrees are illustrated in FIG. 9. The centers of rotation are the intersections of the diagonals of the sample images. Here, if the distance between the eyes is 10 pixels in the sample images, then the central positions of the eyes are all the same. The central positions of the eyes are designated as (x1, y1) and (x2, y2) on a coordinate plane having the upper left corner of the sample image as its origin. The positions of the eyes in the vertical direction (that is, y1 and y2) are the same for all of the sample images.

Arbitrary images of a 30×30 pixel size are employed as the sample images which are known to not be of faces.

Consider a case in which sample images, in which the distance between the eyes are 10 pixels and the rotational angle is 0 degrees (that is, the faces are in the vertical orientation), are employed exclusively to perform learning. In this case, only those faces, in which the distance between the eyes are 10 pixels and which are not rotated at all, would be discriminated by referring to the reference data E1. The sizes of the faces, which are possibly included in the images S0, are not uniform in size. Therefore, during discrimination regarding whether a face is included in the photograph, the image S0 is enlarged/reduced, to enable discrimination of a face of a size that matches that of the sample images. However, in order to maintain the distance between the centers of the eyes accurately at ten pixels, it is necessary to enlarge and reduce the image S0 in a stepwise manner with magnification rates in 1.1 units, thereby causing the amount of calculations to be great.

In addition, faces, which are possibly included in the images S0, are not only those which have rotational angles of 0 degrees, as that illustrated in FIG. 11A. There are cases in which the faces in the photographs are rotated, as illustrated in FIG. 11B and FIG. 11C. However, in the case that sample images, in which the distance between the eyes are 10 pixels and the rotational angle is 0 degrees, are employed exclusively to perform learning, rotated faces such as those illustrated in FIG. 11B and FIG. 11C would not be discriminated as faces.

For these reasons, the present embodiment imparts an allowable range to the reference data E1. This is accomplished by employing sample images, which are known to be of faces, in which the distances between the centers of the eyes are 9, 10, and 11 pixels, and which are rotated in a stepwise manner in three degree increments within a range of ±15 degrees. Thereby, the image S0 may be enlarged/reduced in a stepwise manner with magnification rates in 11/9 units, which enables reduction of the time required for calculations, compared to a case in which the image S0 is enlarged/reduced with magnification rates in 1.1 units. In addition, rotated faces, such as those illustrated in FIG. 11B and FIG. 11C, are also enabled to be discriminated.

Hereinafter, an example of a learning technique employing the sample images will be described with reference to the flow chart of FIG. 12.

The sample images, which are the subject of learning, comprise a plurality of sample images, which are known to be of faces, and a plurality of sample images, which are known to not be of faces. Note that the in sample images, which are known to be of faces, the distances between the centers of the eyes of each face within the images are one of 9, 10, or 11 pixels, and the faces are rotated stepwise in three degree increments within a range of ±15 degrees from the vertical. Each sample image is weighted, that is, is assigned a level of importance. First, the initial values of weighting of all of the sample images are set equally to 1 (step S1).

Next, discriminators are generated for each of the different types of pixel groups of the sample images (step S2). Here, each discriminator has a function of providing a reference to discriminate images of faces from those not of faces, by employing combinations of the characteristic amounts C0, for each pixel that constitutes a single pixel group. In the present embodiment, histograms of combinations of the characteristic amounts C0 for each pixel that constitutes a single pixel group are utilized as the discriminators.

Figure 13:
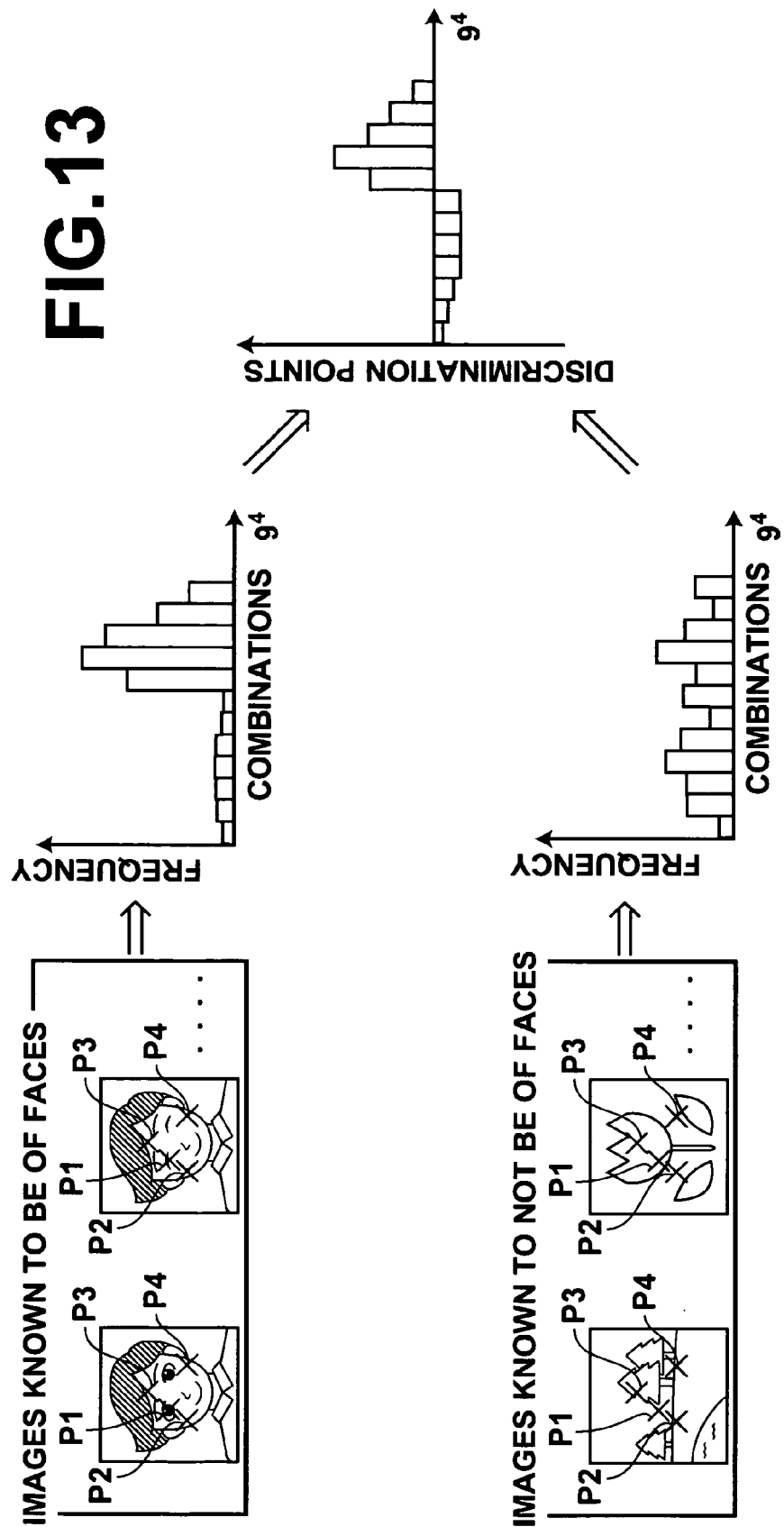
FIG. 13 illustrates a technique for selecting discriminators.

The generation of a discriminator will be described with reference to FIG. 13. As illustrated in the sample images at the left side of FIG. 13, the pixels that constitute the pixel group for generating the discriminator are: a pixel P1 at the center of the right eye; a pixel P2 within the right cheek; a pixel P3 within the forehead; and a pixel P4 within the left cheek, of the sample images which are known to be of faces. Combinations of the characteristic amounts C0 of the pixels P1 through P4 are obtained for all of the sample images, which are known to be of faces, and histograms thereof are generated. Here, the characteristic amounts C0 represent the directions and magnitudes of the gradient vectors K. However, there are 360 possible values (0 through 359) for the direction of the gradient vector K, and 256 possible values (0 through 255) for the magnitude thereof. If these values are employed as they are, the number of combinations would be four pixels at 360×256 per pixel, or $(360\times256)^4$, which would require a great number of samples, time, and memory for learning and detection. For this reason, in the present embodiment, the directions of the gradient vectors K are quaternarized, that is, set so that: values of 0 through 44 and 315 through 359 are converted to a value of 0 (right direction); values of 45 through 134 are converted to a value of 1 (upper direction); values of 135 through 224 are converted to a value of 2 (left direction); and values of 225 through 314 are converted to a value of 3 (lower direction). The magnitudes of the gradient vectors K are ternarized so that their values assume one of three values, 0 through 2. Then, the values of the combinations are calculated employing the following formulas.

Value of Combination=0 (in the case that the magnitude of the gradient vector is 0); and Value of Combination=(direction of the gradient vector+1)×magnitude of the gradient vector (in the case that the magnitude of the gradient vector>0).

Due to the above quaternarization and ternarization, the possible number of combinations becomes $9^4$, thereby reducing the amount of data of the characteristic amounts C0.

In a similar manner, histograms are generated for the plurality of sample images, which are known to not be of faces. Note that in the sample images, which are known to not be of faces, pixels (denoted by the same reference numerals P1 through P4) at positions corresponding to the pixels P1 through P4 of the sample images, which are known to be of faces, are employed in the calculation of the characteristic amounts C0. Logarithms of the ratios of the frequencies in the two histograms are represented by the rightmost histogram illustrated in FIG. 13, which is employed as the discriminator. According to the discriminator, images that have distributions of the characteristic amounts C0 corresponding to positive discrimination points therein are highly likely to be of faces. The likelihood that an image is of a face increases with an increase in the absolute values of the discrimination points. On the other hand, images that have distributions of the characteristic amounts C0 corresponding to negative discrimination points of the discriminator are highly likely to not be of faces. Again, the likelihood that an image is not of a face increases with an increase in the absolute values of the negative discrimination points. A plurality of discriminators are generated in histogram format regarding combinations of the characteristic amounts C0 of each pixel of the plurality of types of pixel groups, which are utilized during discrimination, in step S2.

Thereafter, a discriminator, which is most effective in discriminating whether an image is of a face, is selected from the plurality of discriminators generated in step S2. The selection of the most effective discriminator is performed while taking the weighting of each sample image into consideration. In this example, the percentages of correct discriminations provided by each of the discriminators are compared, and the discriminator having the highest weighted percentage of correct discriminations is selected (step S3). At the first step S3, all of the weighting of the sample images are equal, at 1. Therefore, the discriminator that correctly discriminates whether sample images are of faces with the highest frequency is selected as the most effective discriminator. On the other hand, the weightings of each of the sample images are renewed at step S5, to be described later. Thereafter, the process returns to step S3. Therefore, at the second step S3, there are sample images weighted with 1, those weighted with a value less than 1, and those weighted with a value greater than 1. Accordingly, during evaluation of the percentage of correct discriminations, a sample image, which has a weighting greater than 1, is counted more than a sample image, which has a weighting of 1. For these reasons, from the second and subsequent step S3's, more importance is placed on correctly discriminating heavily weighted sample images than lightly weighted sample images.

Next, confirmation is made regarding whether the percentage of correct discriminations of a combination of the discriminators which have been selected exceeds a predetermined threshold value (step S4). That is, the percentage of discrimination results regarding whether sample images are of faces, which are obtained by the combination of the selected discriminators, that match the actual sample images is compared against the predetermined threshold value. Here, the sample images, which are employed in the evaluation of the percentage of correct discriminations, may be those that are weighted with different values, or those that are equally weighted. In case that the percentage of correct discriminations exceeds the predetermined threshold value, whether an image is of a face can be discriminated by the selected discriminators with sufficiently high accuracy, therefore the learning process is completed. In the case that the percentage of correct discriminations is less than or equal to the predetermined threshold value, the process proceeds to step S6, to select an additional discriminator, to be employed in combination with the discriminators which have been selected thus far.

The discriminator, which has been selected at the immediately preceding step S3, is excluded from selection in step S6, so that it is not selected again.

Next, the weighting of sample images, which were not correctly discriminated by the discriminator selected at the immediately preceding step S3, is increased, and the weighting of sample images, which were correctly discriminated, is decreased (step S5). The reason for increasing and decreasing the weighting in this manner is to place more importance on images which were not correctly discriminated by the discriminators that have been selected thus far. In this manner, selection of a discriminator which is capable of correctly discriminating whether these sample images are of a face is encouraged, thereby improving the effect of the combination of discriminators.

Thereafter, the process returns to step S3, and another effective discriminator is selected, using the weighted percentages of correct discriminations as a reference.

The above steps S3 through S6 are repeated to select discriminators corresponding to combinations of the characteristic amounts C0 for each pixel that constitutes specific pixel groups, which are suited for discriminating whether faces are included in images. If the percentages of correct discriminations, which are evaluated at step S4, exceed the threshold value, the type of discriminator and discrimination conditions, which are to be employed in discrimination regarding whether images include faces, are determined (step S7), and the learning of the reference data E1 is completed.

Note that in the case that the learning technique described above is applied, the discriminators are not limited to those in the histogram format. The discriminators may be of any format, as long as they provide references to discriminate between images of faces and other images by employing combinations of the characteristic amounts C0 of each pixel that constitutes specific pixel groups. Examples of alternative discriminators are: binary data, threshold values, functions, and the like. As a further alternative, a histogram that represents the distribution of difference values between the two histograms illustrated in the center of FIG. 13 may be employed, in the case that the discriminators are of the histogram format.

The learning technique is not limited to that which has been described above. Other machine learning techniques, such as a neural network technique, may be employed.

The face detection executing section 24 refers to the discrimination conditions of the reference data E1, which has been learned regarding every combination of the characteristic amounts C0 of each pixel that constitutes a plurality of types of pixel groups. Thereby, the discrimination points of the combinations of the characteristic amounts C0 of each pixel that constitutes each of the pixel groups are obtained. A face is detected from the image S0 by totaling the discrimination points. At this time, of the characteristic amounts C0, the directions of the gradient vectors K are quaternarized, and the magnitudes of the gradient vectors K are ternarized. In the present embodiment, detection is performed based on the magnitude of the sum of all of the discrimination points, and whether the sum is positive or negative. For example, in the case that the total sum of the discrimination points is positive, it is judged that a face is included in the image S0. In the case that the total sum of the discrimination points is negative, it is judged that a face is not included in the image S0.

Figure 14:
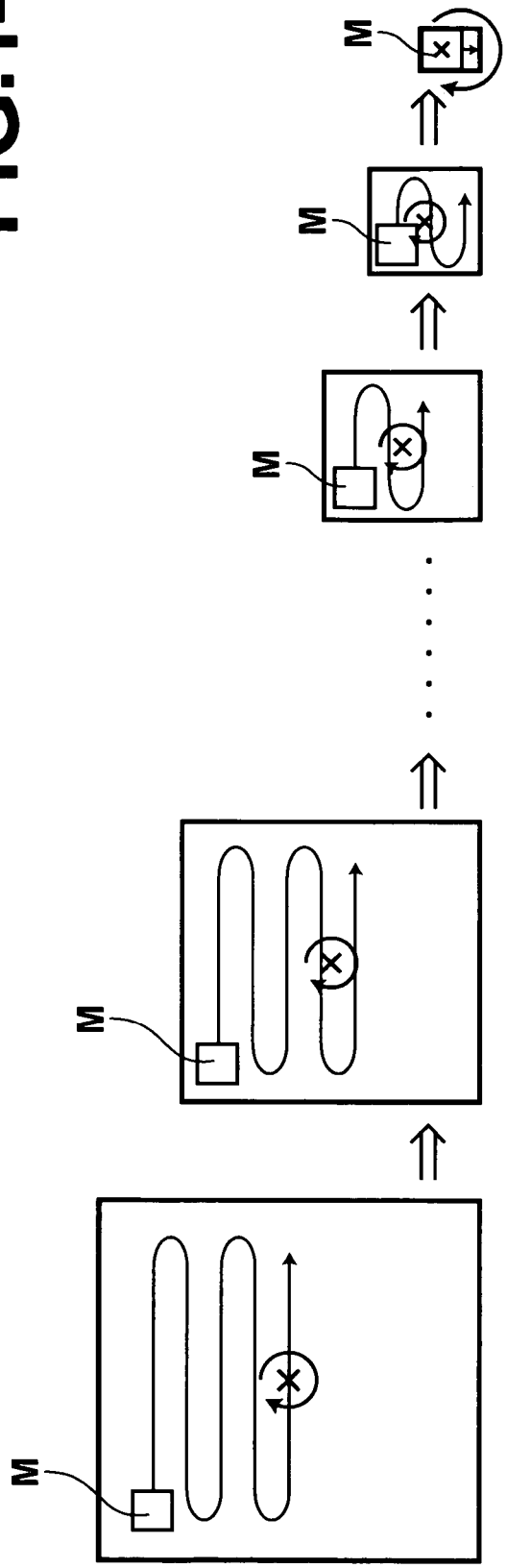
FIG. 14 is a diagram for explaining stepwise deformation of photographs during detection of faces by the characteristic extracting portion.

Here, the sizes of the images S0 are varied, unlike the sample images, which are 30×30 pixels. In addition, in the case that a face is included in the image S0, the face is not necessarily in the vertical orientation. For these reasons, the face detection executing section 24 enlarges/reduces the image S0 in a stepwise manner (FIG. 14 illustrates a reduction process), so that the size thereof becomes 30 pixels in either the vertical or horizontal direction. In addition, the image S0 is rotated in a stepwise manner over 360 degrees. A mask M, which is 30×30 pixels large, is set on the image S0, at every stepwise increment of the enlargement/reduction. The mask M is moved one pixel at a time on the image S0, and whether a face is included in the image S0 is discriminated, by discriminating whether the image within the mask is that of a face (that is, whether the sum of the discrimination points obtained from the image within the mask M is positive or negative). The discrimination is performed at each step of magnification/reduction and rotation of the image S0. A 30×30 pixel size region corresponding to the position of the mask M at which the highest positive value is obtained for the sum of the discrimination points is detected as the facial region. The image of the detected facial region is extracted from the image S0 as a facial image S1.

Note that during learning of the reference data E1, sample images are utilized, in which the distances between the centers of the eyes are one of 9, 10, and 11 pixels. Therefore, the magnification rate during enlargement/reduction of the image S0 may be set to be 11/9. In addition, during learning of the reference data E1, sample images are utilized, in which faces are rotated within a range of ±15 degrees. Therefore, the image S0 and the candidate may be rotated over 360 degrees in 30 degree increments.

Here, the first characteristic amount calculating section 22 calculates the characteristic amounts C0 from the image S0 at each step of their stepwise enlargement/reduction and rotational deformation.

The face detecting section 20 detects the approximate size and position of a face included in the image S0 to obtain the facial image S1 in this manner. Note that the face detecting section 20 judges that a face is included in the image S0 if the sum of the discrimination points is positive. Therefore, there is a possibility that a plurality of facial images S1 are obtained from within a single image S0 by the face detecting section 20.

Figure 3:
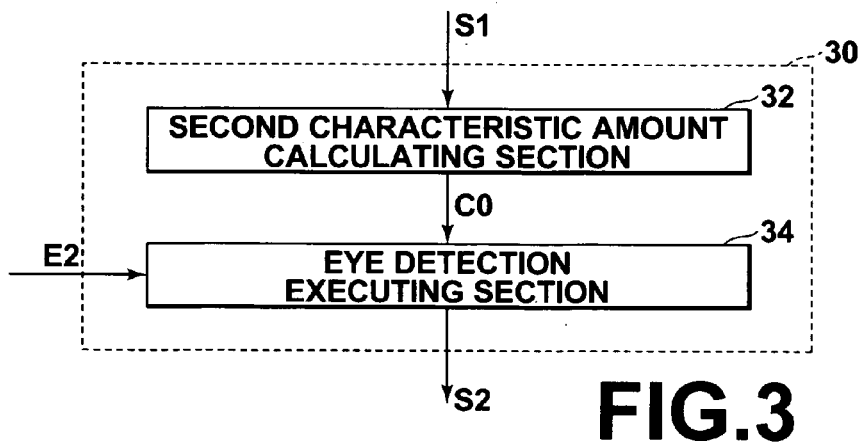
FIG. 3 is a block diagram illustrating the construction of the eye detecting section 30.

FIG. 3 is a block diagram illustrating the construction of the eye detecting section 30. The eye detecting section 30 detects the positions of eyes within the facial images S1 obtained by the face detecting section 20, and obtains true facial images S2 from among the facial images S1. As illustrated in FIG. 3, the eye detecting section 30 comprises: a second characteristic amount calculating section 32, for calculating characteristic amounts C0 from the facial images S1; and an eye detection executing section 34, for detecting the positions of eyes, based on the characteristic amounts C0 and the reference data E2 recorded in the first database 40.

In the present embodiment, the positions of the eyes detected by the eye detection executing section 34 are the centers of the corners of the eyes (indicated by X's in FIGS. 4A and 4B). In the case that the eyes face front, as illustrated in FIG. 4A, the centers are the irises. In the case that the eyes are looking toward the right, as illustrated in FIG. 4B, the centers are not the irises, but the whites of the eyes.

The second characteristic amount calculating section 32 is the same as the first characteristic amount calculating section 22 of the face detecting section 20, except that the characteristic amounts C0 are calculated from the facial images S1 and not the images S0. Therefore, a detailed description thereof will be omitted.

The second reference data E2 recorded in the first database 40 define discrimination conditions for combinations of the characteristic amounts C0 for each pixel of each of a plurality of types of pixel groups, which are constituted by a plurality of pixels selected from sample images, to be described later.

The sample images, which are employed during generation of the second reference data E2 and are known to be of faces, have the following specifications. That is, the sample images are of a 30×30 pixel size, the distances between the centers of the eyes of each face within the images are one of 9.7, 10, or 10.3 pixels, and each of the faces is rotated at one degree intervals within a range ±3 degrees from the vertical. Therefore, the allowable range of the second reference data E2 is narrower than that of the reference data E1, thereby enabling accurate detection of the positions of the eyes. Note that the learning performed to generate the second reference data E2 is the same as that performed to generate the first reference data, except that the sample image groups are different between the two. Therefore, a detailed description thereof will be omitted.

The eye detection executing section 24 refers to the discrimination conditions of the reference data E2, which has been learned regarding every combination of the characteristic amounts C0 of each pixel that constitutes a plurality of types of pixel groups. Thereby, the discrimination points of the combinations of the characteristic amounts C0 of each pixel that constitutes each of the pixel groups are obtained. The positions of eyes included in faces are detected by totaling the discrimination points. At this time, of the characteristic amounts C0, the directions of the gradient vectors K are quaternarized, and the magnitudes of the gradient vectors K are ternarized.

Here, the eye detection executing section 34 enlarges/reduces the facial image S1 in a stepwise manner. In addition, the facial image S1 is rotated in a stepwise manner over 360 degrees. A mask M, which is 30×30 pixels large, is set on the facial image S1, at every stepwise increment of the enlargement/reduction. The mask M is moved one pixel at a time on the image S0, and the positions of eyes included in the image within the mask M are detected.

Note that during learning of the second reference data E2, sample images are utilized, in which the distances between the centers of the eyes are one of 9.7, 10, and 10.3 pixels. Therefore, the magnification rate during enlargement/reduction of the target image S0 and of the candidate may be set to be 10.3/9.7.

The second characteristic amount calculating means 32 calculates the characteristic amounts C0 at each step in the stepwise enlargement/reduction of the facial image S1.

In the present embodiment, the discrimination points are added at each step in the stepwise deformation of each of the facial images S1 obtained by the face detecting section 20. The step of deformation at which the total sum of the discrimination points within the 30×30 pixel size mask M is the greatest is determined. The upper left corner of the facial image within the mask M is set as the origin of a coordinate system. The coordinates of the positions of the eyes (x1, y1) and (x2, y2) are obtained, and positions corresponding to these coordinates in the target image, prior to deformation thereof, are discriminated as the positions of the eyes.

The eye detection executing section 30 detects the positions of the eyes from within the facial images S1 as described above. The positions of the eyes, are output to the frame model constructing section 50. In addition, the facial images S1, in which the positions of the eyes are detected, are output to the frame model construction section 50 as true facial images S2.

Figure 15:
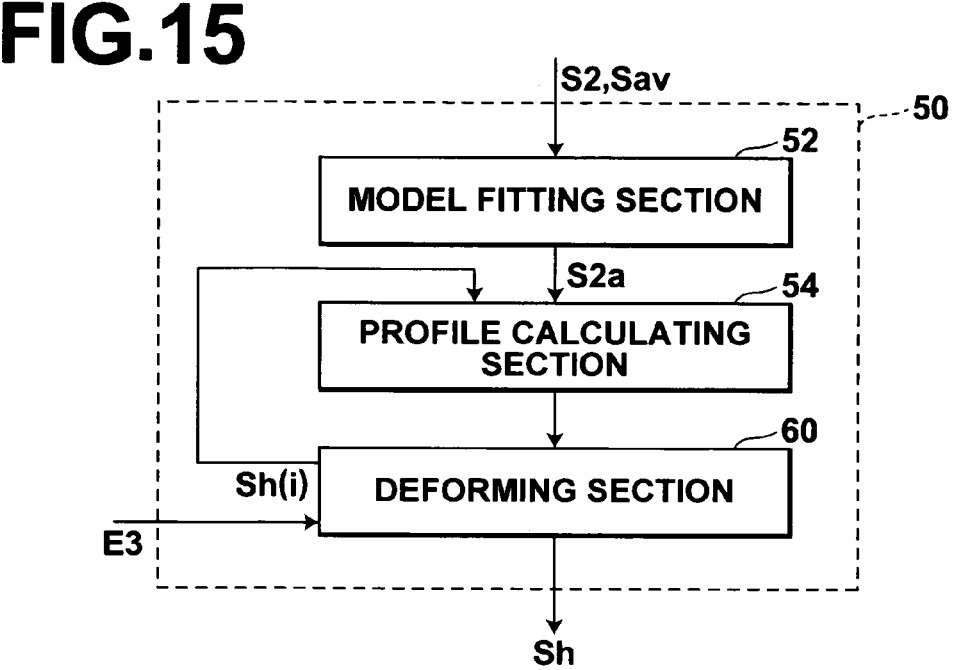
FIG. 15 is a block diagram that illustrates the construction of a frame model constructing section of the image processing apparatus of FIG. 1.

FIG. 15 is a block diagram illustrating the construction of the frame model construction section 50 of the image processing apparatus of FIG. 1. The frame model construction section 50 employs the reference data E3 and the average frame model Sav, recorded in the second database 80, to obtain frame models of faces within the facial images S2 obtained by the eye detecting section 30. As illustrated in FIG. 15, the frame model construction section comprises: a model fitting section 52, for fitting the average frame model Sav into the facial images S2; a profile calculating section 54, for calculating profiles to discriminate each landmark; and a deforming section 60, for deforming the average frame model Sav based on the brightness profiles calculated by the profile calculating section 54 and the reference data E3, to obtain frame models Sh. Here, the average frame model Sav and the reference data E3 recorded in the second database 80, and each of the constituent parts of the frame model constructing section 50 will be described in detail.

The average frame model Sav recorded in the second database 80 is obtained from a plurality of sample images, which are known to be of faces. In the image processing apparatus of the present embodiment, sample images, which have been normalized such that they are 90×90 pixels in size, and in which the distances between the centers of the eyes pictured therein are 30 pixels, are employed. First, an operator specifies the positions of landmarks that represent the shapes of faces, and the shapes and positional relationships of noses, mouths, and eyes, in the sample images. 130 landmarks are specified, such that the left corner of the left eye, the center of the left eye, the right corner of the left eye, the central point between the eyes, and the tip of the chin are designated as $1^{st}$, $2^{nd}$, $3^{rd}$, $4^{th}$, and $110^{th}$ landmarks, respectively, for example. After the sample images are arranged such that the central points between the eyes are aligned, the positions of corresponding landmarks (landmarks which have the same ordinal number) are averaged, to obtain average positions of each of the landmarks. The average frame model Sav defined in Formula (2) is constructed by the average positions of the landmarks obtained in this manner.

K (less than or equal to twice the number of landmarks, here, less than or equal to 260, and 16 for example) unique vectors $P_j$ ($P_{j1}, P_{j2}, \ldots P_{j(206)}$) ($1 \leq j \leq K$) and K unique values $\lambda_j$ ($1 \leq j \leq K$) that correspond to each of the unique vectors $P_j$, obtained from the sample images and the average frame model Sav, are also recorded in the second database 80. The method by which the unique vectors $P_j$ and the unique values $\lambda_j$ are obtained is a conventional technique. Therefore, a detailed description thereof will be omitted.

The reference data E3, recorded in the second database 80, define brightness profiles, which are defined for each landmark within a face, and discrimination conditions for the brightness profiles. The reference data E3 is generated by learning portions, which are known to be positions represented by landmarks, and portions, which are known to not be positions represented by landmarks, of a faces within a plurality of sample images, in advance. Here, obtainment of discrimination conditions with respect to a brightness profile will be described, with a landmark positioned at the recess within the upper lip as an example.

Figure 19A:
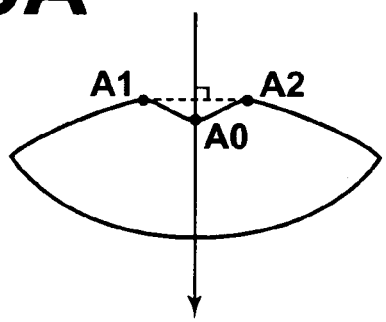
FIGS. 19A and 19B are diagrams for explaining a brightness profile which is defined with respect to a landmark.
Figure 19B:
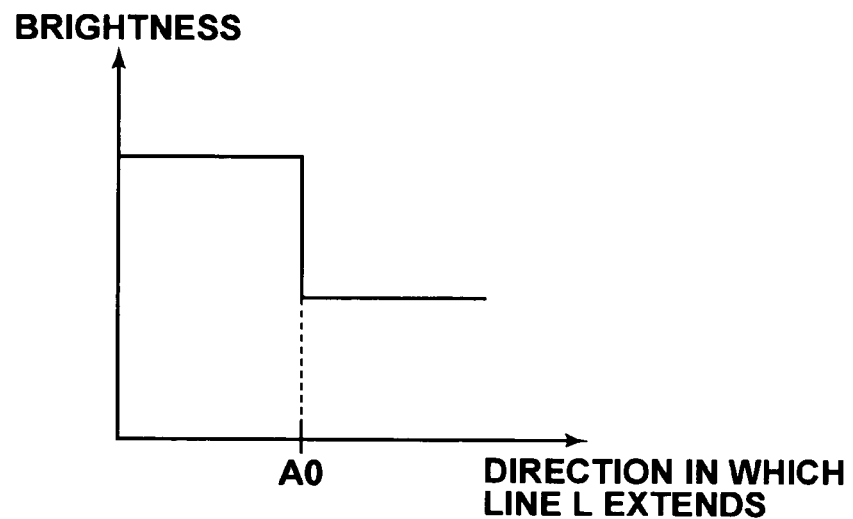

In the present embodiment, the same sample images, which are used to obtain the average frame model Sav, are employed to generate the reference data E3. The sample sizes are normalized such that they are 90×90 pixels in size, and such that the distances between the centers of the eyes pictured therein are 30 pixels. The brightness profile, which is defined for the landmark representing the recess of the upper lip, is a brightness profile of 11 pixels along the line L illustrated in FIG. 19. A first line that connects the landmarks adjacent thereto at both sides thereof (points A1 and A2 in FIG. 19A) is drawn. The line L is perpendicular to the first line and that passes through the landmark A0. In order to obtain discrimination conditions with respect to the brightness profile defined for the landmark representing the recess of the upper lip, first, profiles of the landmark representing the recess of the upper lip are calculated in the faces of each of the sample images. Then, brightness profiles, which are defined for the landmark representing the recess of the upper lip, are calculated with respect to other arbitrary positions (for example, a corner of an eye) within the sample images.

In order to reduce processing time, the profiles are polytomized, for example, into five values. In the image processing apparatus of the present embodiment, the brightness profiles are polytomized into five values based on variance. Specifically, the polytomization is performed by obtaining variances σ of each brightness value (in the case of the brightness profile of the landmark positioned at the recess of the upper lip, the brightness values of the 11 pixels employed to obtain the brightness profile) that constitutes the brightness profile. Then, polytomization is performed in units of variances, with an average brightness value Yav as the center of distribution. For example, brightness values less than or equal to (Yav−(3/4σ)) may be assigned a value of 0, brightness values between (Yav−(3/4σ)) and (Yav−(1/4σ)) may be assigned a value of 1, brightness values between (Yav−(1/4σ)) and (Yav+(1/4σ)) may be assigned a value of 2, brightness values between (Yav+(1/4σ)) and (Yav+(3/4σ)) may be assigned a value of 3, and brightness values greater than or equal to (Yav+(3/4σ)) may be assigned a value of 4.

The discrimination conditions for discriminating the profile of the landmark representing the recess of the upper lip are obtained by learning the polytomized profiles of the landmarks representing the recess of the upper lip (hereinafter, referred to as the "first profile group") and of the landmarks representing the arbitrary point (hereinafter, referred to as the "second profile group").

The technique for learning the two types of profile groups is the same as that for learning the reference data E1 employed by the face detecting section 20 and for learning the referenced data E2 employed by the eye detecting section 30. The technique will be described briefly here.

The generation of a discriminator will be described first. The shape of the combination of each of the brightness values that constitute a brightness profile is designated as the brightness profile. There are five brightness values, 0, 1, 2, 3, and 4, and each brightness profile includes 11 pixels. Therefore, the number of combinations of the brightness values is $5^{11}$, which would require a great amount of time and memory to learn and detect. For this reason, only a portion of the pixels that constitute each brightness profile is employed in the present embodiment. For example, in the case that the profile is constituted by brightness values of 11 pixels, only the brightness values of the $2^{nd}$, the $6^{th}$, and the $10^{th}$ pixel are employed. The number of combinations of these three pixels is $5^3$, and therefore reductions in processing time and the amount of memory used can be achieved. When generating the discriminator, first, combinations of the brightness values (combinations of the brightness values of the $2^{nd}$, $6^{th}$, and $10^{th}$ pixels) of all of the profiles within the first profile group are obtained, and histograms are generated. Next, histograms are generated for the profiles included in the second profile group. Histograms that represent logarithms of the frequency ratio between the two histograms are employed as the discriminators for brightness profiles of the landmark. In a manner similar to that of the discriminator generated to detect faces, if the value (discrimination point) indicated by each vertical axis of the histograms of the discriminators is positive, the probability that the position of the profile having the brightness value distribution corresponding to the discrimination point is the recess of the upper lip is high. This probability increases as the absolute value of the discrimination point increases. On the other hand, if the discrimination point is negative, the probability that the position of the profile having the brightness value distribution corresponding to the discrimination point is not the recess of the upper lip is high. This probability also increases as the absolute value of the discrimination point increases.

A plurality of discriminators in the histogram format are generated with respect to the brightness profiles of the landmarks representing the recess of the upper lip.

Next, a discriminator, which is most effective in discriminating whether a landmark is that which represents the recess of the upper lip, is selected from the plurality of generated discriminators. Here, the method for selecting the most effective discriminator for discriminating the brightness profiles of landmarks is the same as the method for selecting the discriminator for the reference data E1 employed by the face detecting section 20. Therefore, a detailed description will be omitted.

The type of discriminator and the discrimination conditions, to be employed in discriminating whether a brightness profile is that of the landmark representing the recess of the upper lip, is determined as a result of learning the first profile group and the second profile group.

Here, the machine learning technique employed to learn the first profile group and the second profile group is based on the adaptive learning technique. However, the present invention is not limited to this configuration. Other machine learning techniques, such as the neural network technique, may be employed.

The frame model constructing section 50 will be described further. The model fitting section 52 of the frame model constructing section 50 illustrated in FIG. 15 fits the average frame model Sav recorded in the second database 80 into the face within the facial image S2. When fitting the average frame model Sav into the face, it is desirable that the orientation, position, and size of the face represented by the average frame model and the face within the facial image S2 are matched as best as possible. Here, the facial image S2 is rotated and enlarged/reduced such that the positions of the landmarks that represent the center positions of the eyes within the average frame model Sav and the positions of the eyes detected by the eye detecting section 30 are matched. Note that the facial image S2, which has been rotated and enlarged/reduced to fit the average frame model Sav thereinto is referred to as a facial image S2*a*.

The profile calculating section 54 obtains profiles groups, by calculating brightness profiles defined for each landmark at the positions of each pixel included in a predetermined range that includes a pixel of the facial image S2*a* that corresponds to each landmark of the average frame model Sav. For example, consider a case in which the landmark that represents the recess of the upper lip is the $80^{th}$ landmark from among 130 landmarks. In this case, the brightness profile defined for the $80^{th}$ landmark is that illustrated in FIG. 19 (the combination of the brightness values of 11 pixels, included in the reference data E3). The profile calculating section 54 calculates this brightness profile for each pixel included in a predetermined range having a pixel (pixel A), the position of which corresponds to the $80^{th}$ landmark of the average frame model Sav, at its center. Note that the "predetermined range" refers to a range of pixels greater than the pixel range corresponding to the brightness profiles included in the reference data E3. For example, the brightness profile for the $80^{th}$ landmark is a profile of the brightness values of 11 pixels along the line L in FIG. 19, with the $80^{th}$ landmark as the center pixel. Therefore, the "predetermined range" in this case is a range of, for example, 21 pixels along the line L. Brightness profiles of sets of 11 continuous pixels having each of the 21 pixels as the center pixel are obtained. That is, 21 profiles are calculated in the facial image S2*a* for the landmark representing the recess of the upper lip in the average frame model, and output to the deforming section 60 as a profile group. Similar profile groups are obtained for each of the landmark (130 landmarks in the present embodiment). Note that here, all of the brightness profiles are polytomized into five values.

Figure 16:
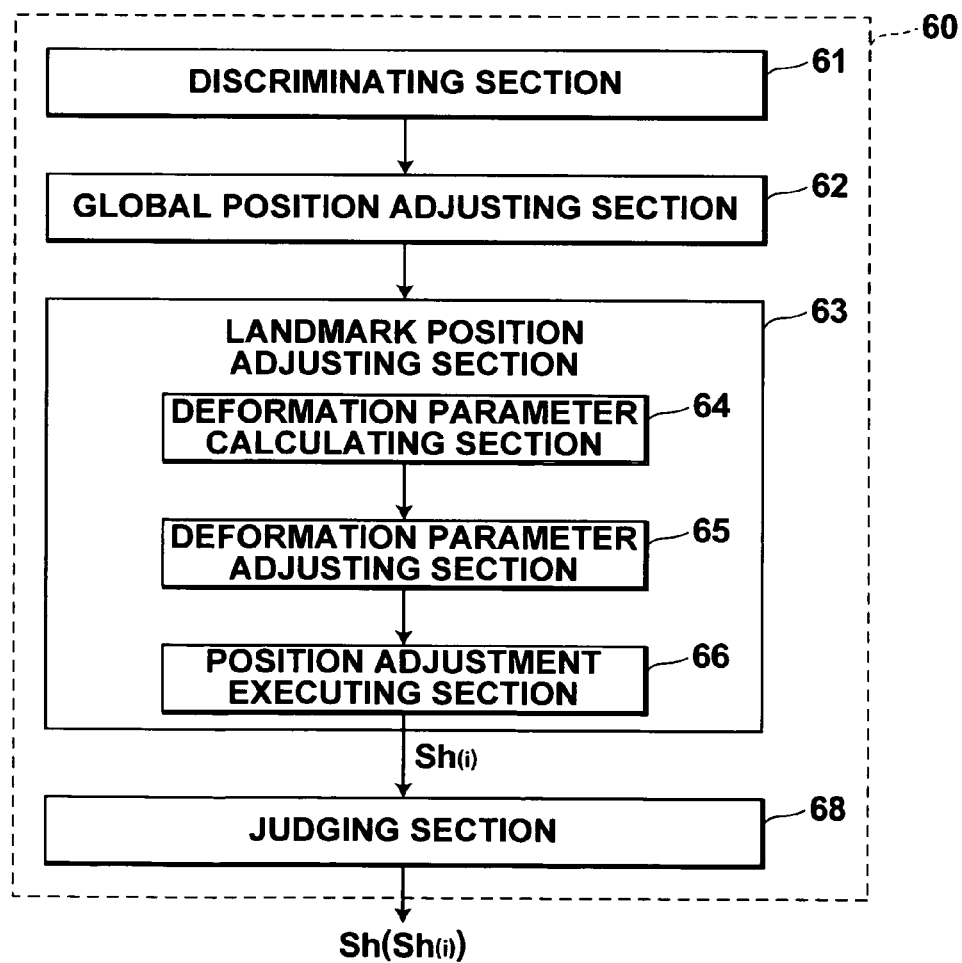
FIG. 16 is a block diagram that illustrates the construction of a deforming section of the frame model constructing section of FIG. 15.

FIG. 16 is a block diagram illustrating the construction of the deforming section 60. As illustrated in FIG. 16, the deforming section 60 comprises: a discriminating section 61; a global position adjusting section 62; a landmark position adjusting section 63; and a judging section 68.

The discriminating section 61 discriminates whether each of the profiles included in each of the profile groups calculated by the profile calculating section 54 are profiles of the landmarks that they correspond to. Specifically, for example, discriminators and discrimination conditions defined for the $80^{th}$ landmark are employed to discriminate the 21 profiles included in the profile group obtained for the landmark representing the recess of the upper lip in the average frame model Sav, and discrimination points are obtained. In the case that the sum of the discrimination points for a profile is positive, it is judged that the probability that the profile is the profile of the $80^{th}$ landmark is high. That is, it is judged that the probability that the pixel corresponding to the profile (the center pixel of the 11 pixels, or the $6^{th}$ pixel) is the pixel that represents the $80^{th}$ landmark is high. On the other hand, if the sum of the discrimination points for a profile is negative, it is judged that the probability that the profile is the profile of the $80^{th}$ landmark is low. That is, it is judged that the probability that the pixel corresponding to the profile is the pixel that represents the $80^{th}$ landmark is low. Then, the discriminating section 61 discriminates the pixel that corresponds to the profile having the positive sum of discrimination points and the greatest absolute value from among the 21 profiles as the $80^{th}$ landmark. Meanwhile, in the case that none of the 21 profiles has a positive sum of discrimination points, it is judged that none of the 21 pixels corresponding thereto are the $80^{th}$ landmark.

The discriminating section 61 performs the above discrimination for each landmark, and outputs the discrimination results for each landmark to the global position adjusting section 62.

As described previously, the eye detecting section 30 employs a mask of the same size as the sample images (30×30 pixels) to detect the positions of the eyes. However, the frame model constructing section employs the average frame model Sav, which is obtained from sample images which are 90×90 pixels in size, to accurately detect the positions of landmarks. Therefore, there is a possibility that positional displacement will occur, when the positions of the eyes detected by the eye detecting section 30 and the centers of the eyes within the average frame model Sav are matched.

The global position adjusting section 62 adjusts the position of the entire average frame model, based on the discrimination results obtained by the discriminating section 61. Specifically, the global position adjusting section 62 linearly moves, rotates, and enlarges/reduces the average frame model Sav as necessary, to further reduce the differences in the position, size, and orientation of the face in the facial image S2*a* and that represented by the average frame model Sav. First, the global position adjusting section 62 calculates maximum values of the amounts of movement (the amount and direction of movement) for each landmark of the average frame model Sav, based on the discrimination results for the landmarks obtained by the discriminating section 61. The maximum value of the amount of movement, for example, for the $80^{th}$ landmark, is calculated so that the position of the $80^{th}$ landmark of the average frame model Sav is moved to the position of the pixel within the facial image S2*a*, discriminated to be the $80^{th}$ landmark by the discriminating section 61. Next, the global position adjusting section 62 calculates values smaller than the maximum values of the amounts of movement (in the present embodiment, ⅓ of the maximum values) as the amounts of movement. The amounts of movement are calculated for each landmark, and are represented as total amounts of movement, comprising vectors V (V1, V2, ... V2*n*) (n=the number of landmarks; 130 in this case).

The global position adjusting section 62 judges whether linear movement, rotation, and/or enlargement/reduction of the average frame model Sav is necessary, based on the amounts of movement calculated for each landmark thereof. In the case that it is judged that such deformation is necessary, the deformation is performed, and the facial image S2*a*, in which the adjusted average frame model Sav is fitted, is output to the landmark position adjusting section 63. In the case that it is judged that such deformation is not necessary, the facial image S2*a* is output to the landmark position adjusting section 63 as is, without globally adjusting the average frame model Sav. For example, consider a case in which the directions of movement, included in the amounts of movement for each landmark of the average frame model Sav, tend to be the same direction. In this case, it can be judged that linear movement of the average frame model Sav is necessary for the entire average frame model. As another example, consider a case in which the directions of movement, included in the amounts of movement for each landmark of the average frame model Sav, are different, but tend to be directed toward rotation. In this case, it can be judged that rotation of the average frame model Sav in this rotational direction is necessary. As yet another example, consider a case in which the directions of movement, included in the amounts of movement for the landmarks that represent the outline of the face in the average frame model Sav, all point outward from the face. In this case, it can be judged that it is necessary to enlarge the average frame model Sav.

The global position adjusting section 62 adjusts the global position of the average frame model Sav in the manner described above. The facial image S2a, into which the adjusted average frame model Sav is fitted, is output to the landmark position adjusting section 63. Here, the amounts that each of the landmarks are actually moved by the global position adjusting section 62 are designated as global amounts of movement V, comprising vectors Va (V1a, V2a, . . . V2na).

The landmark position-adjusting section 63 deforms the average frame model Sav, the position of which has been globally adjusted, by moving the positions of each of the landmarks. As illustrated in FIG. 16, the landmark position adjusting section 63 comprises: a deformation parameter calculating section 64; a deformation parameter adjusting section 65; and a positional adjustment executing section 66. First, the deformation parameter calculating section 64 calculates individual amounts of movement Vb (V1b, V2b, . . . V2nb) for each of the landmarks, according to Formula (6) below.

$$Vb = V - Va \qquad (6)$$

wherein

V: total amounts of movement
Va: global amounts of movement
Vb: individual amounts of movement The deformation parameter calculating section 64 calculates deformation parameters $b_j$ that correspond to the individual amounts of movement Vb according to Formula (4). The unique vectors $P_j$, which are recorded in the second database 80, and the individual amounts of movement Vb (corresponding to ΔS in Formula (4)) calculated by Formula (6) are substituted into Formula (4) when calculating the deformation parameters $b_j$.

If the amounts of movement of the landmarks of the average frame model Sav are excessive, the average frame model Sav after the landmarks are moved will no longer represent a face. Therefore, The deformation parameter adjusting section 65 adjusts the deformation parameters $b_j$ calculated by the deformation parameter calculating section 64 according to Formula (5). Specifically, in the case that a value of $b_j$ satisfies Formula (5), the deformation parameter $b_j$ is maintained as is. In the case that a value of $b_j$ does not satisfy Formula (5), the deformation parameter $b_j$ is corrected such that the value $b_j$ falls within the range defined in Formula (5), with the greatest absolute value within the range, while maintaining the positive/negative character of the value $b_j$.

The positional adjustment executing section 66 deforms the average frame model Sav according to Formula (4), employing the deformation parameters adjusted in this manner. That is, the positions of each of the landmarks of the average frame model Sav are moved to obtain a frame model Sh(1).

The judging section 68 judges whether the frame model converges on the face. For example, the sum of the absolute values of the differences between corresponding landmarks of the frame model prior to deformation (the average frame model Sav in this case) and the frame model following deformation (the frame model Sh(1) in this case) is obtained. In the case that the sum is less than or equal to a predetermined threshold value, it is judged that convergence has occurred, and the deformed frame model (the frame model Sh(1)) is output as a target frame model Sh. In the case that the sum is grater than the predetermined threshold value, it is judged that convergence has not occurred, and the deformed frame model (the frame model Sh(1)) is output to the profile calculating section 54. In the latter case, the processes performed by the profile calculating section 54, the discriminating section 61, the global position adjusting section 62, and the landmark position adjusting section 63 are administered on the deformed frame model (Sh(1)) and the facial image S2a, to obtain a new frame model Sh(2).

The series of processes performed by the profile calculating section 54, the discriminating section 61, the global position adjusting section 62, and the landmark position adjusting section 63 are repeated until it is judged that convergence has occurred. Then, the frame model in which convergence has occurred is obtained as the target frame model Sh, and the processes of the image processing apparatus ends.

Figure 17:
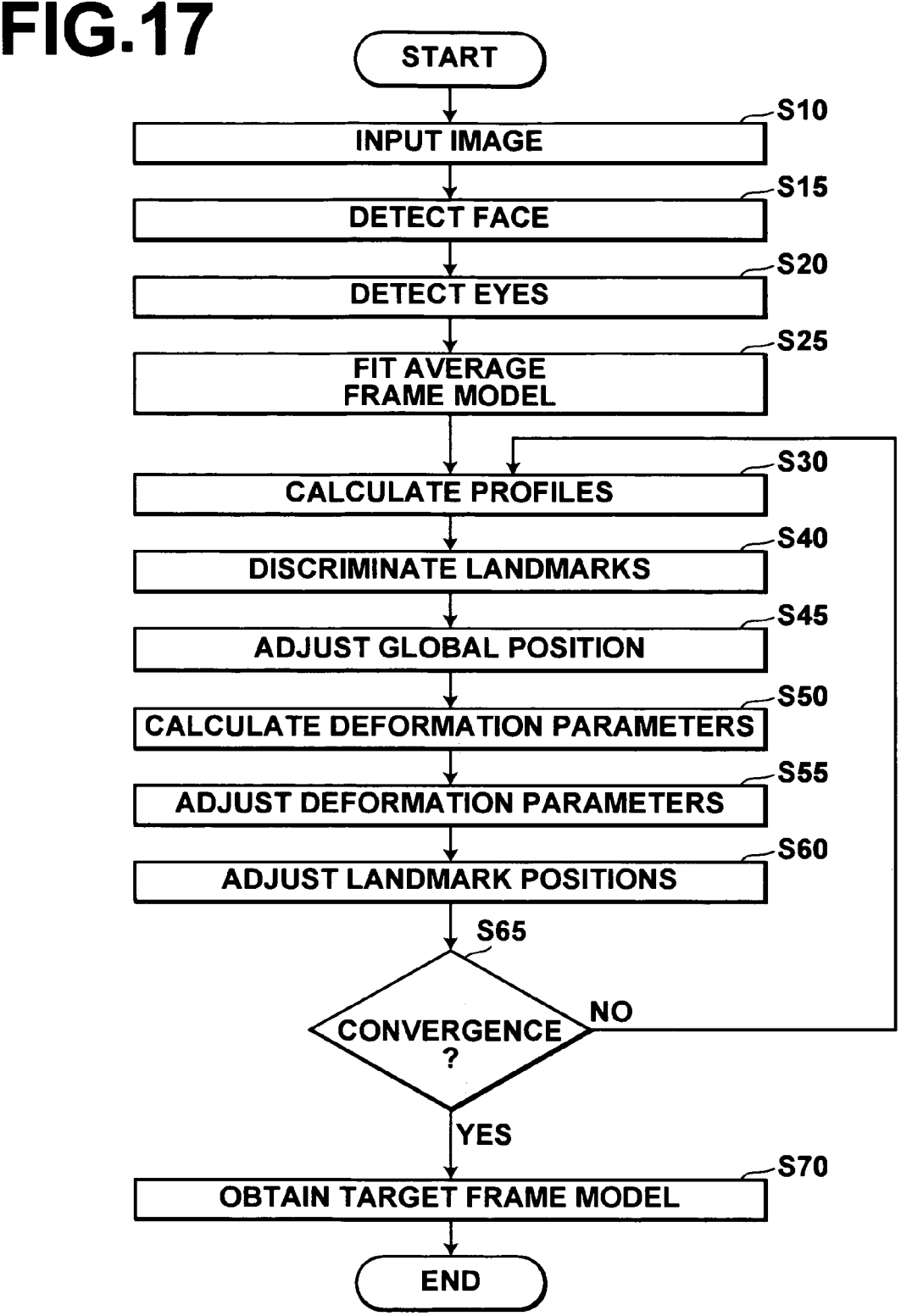
FIG. 17 is a flow chart that illustrates the processes performed by the image processing apparatus of FIG. 1.
Figure 18:
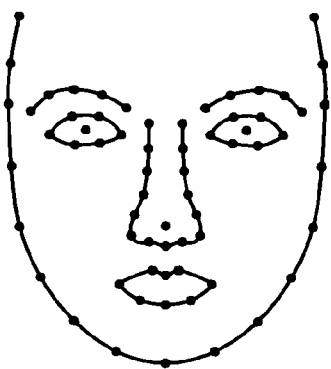
FIG. 18 is a diagram illustrating examples of landmarks specified for a single face.

FIG. 17 is a flow chart that illustrates the processes performed by the image processing apparatus according to the embodiment of FIG. 1. As illustrated in FIG. 17, when an image S0 is input to the image processing apparatus, first, the face detecting section 20 and the eye detecting section 30 detects a face included in the image S0, and obtains the positions of the eyes within the face, and the facial image S2 (steps S10, S15, S20). The model fitting section 52 of the frame model constructing section 50 fits the average frame model Sav, which is obtained from the plurality of sample images of faces and recorded in the second database 80, into the facial image S2 (step S25). Note that for the fitting process, the facial image S2 is rotated and/or enlarged/reduced to become the facial image S2a, such that the positions of the eyes therein match the positions of the eyes in the average frame model Sav. The profile calculating section 54 obtains brightness profiles, defined for each landmark in the average frame model Sav, for each pixel within a predetermined range that includes the landmark, within the facial image S2a, to obtain profile groups comprising pluralities of brightness profiles with respect to each landmark (step S30).

The discriminating section 61 of the deforming section 60 discriminates a profile as the brightness profile defined for each landmark, from each profile group. For example, the profile defined for the $80^{th}$ landmark of the average frame model Sac is discriminated from the profile group obtained for the $80^{th}$ landmark. The position of the pixel corresponding to the discriminated profile is discriminated as the position of the landmark (for example, the $80^{th}$ landmark). On the other hand, in the case that none of the profiles within a profile group are discriminated as the brightness profile defined for the landmark corresponding thereto, it is discriminated that none of the positions of the pixels corresponding to the profiles in the profile groups is the position of the landmark (step S40).

Thereafter, the discrimination results of the discriminating section 61 are output to the global position adjusting section 62. The global position adjusting section 62 obtains the total amounts of movement V for the landmarks of the average frame model Sav, based on the discrimination results of the discriminating section 61. The entire average frame model Sav is moved linearly, rotated, and/or enlarged/reduced, based on the total amounts of movement V (step S45). Note that the amount of movement of each landmark of the average frame model Sav, the position of which is globally adjusted, is the global amounts of movement V Va.

The deformation parameter calculating section 64 obtains individual amounts of movement Vb for each landmark, based on the differences between the total amounts of movement V and the global amounts of movement Va, and calculates deformation parameters corresponding to the individual amounts of movement Vb (step S50). The deformation parameter adjusting section 65 adjusts the deformation parameters calculated by the deformation parameter calculating section 64 according to Formula (5) and outputs the adjusted deformation parameters to the positional adjustment executing section 66 (step S55). The positional adjustment executing section 66 employs the deformation parameters adjusted by the deformation parameter adjusting section 65, to adjust the positions of the individual landmarks, to obtain the frame model Sh(1) (step S60).

The processes from step S30 through step S60 are performed with respect to the frame model Sh(1) and the facial image S2a, and the frame model Sh(2) is obtained, by moving the landmarks of the frame model Sh(1). In this manner, the processes from step S30 through step S60 are repeated until the judging section 68 judges that convergence has occurred (step S65:NO, steps S30-S60). The frame model, in which convergence occurs, is obtained as the target frame model Sh (step S65:Yes).

In this manner, the image processing apparatus of the present embodiment detects points that represent landmarks included in a facial image. Discriminators, obtained by learning brightness profiles of points which are known to be landmarks within a plurality of sample images and brightness profiles of points which are known to not be landmarks within a plurality of sample images, and discriminating conditions corresponding to each discriminator are employed to detect the landmarks. Therefore, accuracy and robustness of detection is high, compared to conventional techniques that detect brightness profiles similar to average brightness profiles obtained from points which are known to be landmarks within a plurality of sample images.

In addition, brightness profiles which are polytomized, (into five values in the present embodiment) are employed as the characteristic amounts. Thereby, the amount of calculations is reduced, and therefore reductions in processing time and the amount of memory used can be achieved. Accurate detection can be realized, regardless of fluctuations in lighting and the like during photography of the images S0.

Conventional methods for detecting a predetermined landmark within images detect points within the images having brightness profiles most similar to an average brightness profile for the predetermined landmark, obtained from a plurality of sample images. The points are detected from within ranges of pixels that include the position of the corresponding landmark of an average frame model Sav, and the detected points are designated as the position of the predetermined landmark. Therefore, even in the case that a portion of a face is covered by an obstacle, such as a hand, the landmark of the average frame model Sav corresponding to the covered portion is moved, ultimately resulting in an inaccurate frame model Sh. In these cases, there is a possibility that a frame model is constructed which is totally incapable of representing the face included in the image. In contrast to this, the image processing apparatus of the present embodiment judges whether a point that represents a landmark is present within a range of pixels that includes the position of the landmark of the average frame model Sav within the facial image. In the case that the result of judgment is negative, the position of the landmark of the average frame model Sav is not moved. Therefore, in the case that a portion of a face is covered by an obstacle, such as a hand, the position of the landmark at the covered portion of the average frame model Sav is not moved, and an accurate frame model Sh can be obtained.

A preferred embodiment of the present invention has been described above. However, the image processing method, the image processing apparatus, and the image processing program is not limited to the above embodiment. Various changes can be made, as long as they do not depart from the spirit of the present invention.

For example, brightness profiles were employed as the characteristic amounts for specifying landmarks in the above embodiment. However, the present invention is not limited to this configuration. Any characteristic amounts which are capable of specifying landmarks, such as derivative values of the brightness profiles, may be employed.

In addition, histograms were employed as the discriminators in the above embodiment. However, any discriminator which is employed in machine learning techniques may be employed.

What is claimed is:

1. An image processing method for detecting the positions of a plurality of landmarks that indicate the shape of a predetermined subject by their positions and/or their positional relationships, from within the predetermined subject included in an image, comprising the steps of:

setting the positions of a plurality of landmarks that indicate the average shape of the predetermined subject as preliminary positions of the landmarks included in the predetermined subject included in the image;

calculating characteristic amounts, which are defined for a landmark corresponding to a preliminary position, of each pixel within a range of pixels that includes the preliminary position to discriminate the landmark, wherein the calculating characteristic amounts is performed by a processor;

judging whether pixels that represent the landmark are included in the range, by discriminating whether each of the pixels within the range represents the landmark;

moving the preliminary position to approach the position of the pixel which has been discriminated to represent the landmark, in the case that the judgment is affirmative;

repeating the preceding three steps for all of the preliminary positions; and determining the positions of the preliminary positions after they have been moved to be the positions of the landmarks that correspond to each of the preliminary positions;

the discrimination regarding whether the pixels represent the landmarks being performed, based on learning characteristic amounts of positions, which are known to represent the landmarks, and characteristic amounts of positions, which are known to not represent the landmarks, of a plurality of sample images by a machine learning technique.

2. An image processing method as defined in claim 1, wherein:

the machine learning technique is a boosting technique.

3. An image processing method as defined in claim 1, wherein:

the machine learning technique is a neural network technique.

4. An image processing method as defined in claim 1, wherein:

the moving step does not move the preliminary position in the case that it is judged that a pixel that represents the landmark corresponding to the preliminary position is not included in the range of pixels that includes the preliminary position.

5. An image processing method as defined in claim 1, wherein:
the characteristic amounts are brightness profiles of the positions of the landmarks.

6. An image processing method as defined in claim 5, wherein:
the brightness profiles are polytomized.

7. An image processing method as defined in claim 1, wherein:
the predetermined subject is a human face.

8. An image processing method as defined in claim 1, wherein:
the landmarks are utilized in statistical models that represent the position, shape and size of each structural element of the predetermined subject.

9. An image processing method as defined in claim 8, wherein:
the statistical models include an ASM (Active Shape Model).

10. An image processing apparatus for detecting the positions of a plurality of landmarks that indicate the shape of a predetermined subject by their positions and/or their positional relationships, from within the predetermined subject included in an image, comprising:
preliminary position setting means, for setting the positions of a plurality of landmarks that indicate the average shape of the predetermined subject as preliminary positions of the landmarks included in the predetermined subject included in the image;
moving means, for: calculating characteristic amounts, which are defined for a landmark corresponding to a preliminary position, of each pixel within a range of pixels that includes the preliminary position to discriminate the landmark; judging whether pixels that represent the landmark are included in the range, by discriminating whether each of the pixels within the range represents the landmark; moving the preliminary position to approach the position of the pixel which has been discriminated to represent the landmark, in the case that the judgment is affirmative; and repeating the preceding three steps for all of the preliminary positions; and
landmark position determining means, for determining the positions of the preliminary positions after they have been moved to be the positions of the landmarks that correspond to each of the preliminary positions;
the moving means performing discrimination regarding whether the pixels represent the landmarks, based on learning characteristic amounts of positions, which are known to represent the landmarks, and characteristic amounts of positions, which are known to not represent the landmarks, of a plurality of sample images by a machine learning technique.

11. An image processing apparatus as defined in claim 10, wherein:
the machine learning technique is a boosting technique.

12. An image processing apparatus as defined in claim 11, wherein:
the machine learning technique is a neural network technique.

13. An image processing apparatus as defined in claim 10, wherein:
the moving means does not move the preliminary position in the case that it is judged that a pixel that represents the landmark corresponding to the preliminary position is not included in the range of pixels that includes the preliminary position.

14. An image processing apparatus as defined in claim 10, wherein:
the characteristic amounts are brightness profiles of the positions of the landmarks.

15. An image processing apparatus as defined in claim 14, wherein:
the brightness profiles are polytomized.

16. An image processing apparatus as defined in claim 10, wherein:
the predetermined subject is a human face.

17. An image processing apparatus as defined in claim 10, wherein:
the landmarks are utilized in statistical models that represent the position, shape and size of each structural element of the predetermined subject.

18. An image processing apparatus as defined in claim 17, wherein:
the statistical models include an ASM (Active Shape Model).

19. A computer readable recording medium having recorded therein a program that causes a computer to execute an image processing method for detecting the positions of a plurality of landmarks that indicate the shape of a predetermined subject by their positions and/or their positional relationships, from within the predetermined subject included in an image, comprising the procedures of:
setting the positions of a plurality of landmarks that indicate the average shape of the predetermined subject as preliminary positions of the landmarks included in the predetermined subject included in the image;
calculating characteristic amounts, which are defined for a landmark corresponding to a preliminary position, of each pixel within a range of pixels that includes the preliminary position to discriminate the landmark;
judging whether pixels that represent the landmark are included in the range, by discriminating whether each of the pixels within the range represents the landmark;
moving the preliminary position to approach the position of the pixel which has been discriminated to represent the landmark, in the case that the judgment is affirmative;
repeating the preceding three steps for all of the preliminary positions; and
determining the positions of the preliminary positions after they have been moved to be the positions of the landmarks that correspond to each of the preliminary positions;
the discrimination regarding whether the pixels represent the landmarks being performed, based on learning characteristic amounts of positions, which are known to represent the landmarks, and characteristic amounts of positions, which are known to not represent the landmarks, of a plurality of sample images by a machine learning technique.

* * * * *